(12) United States Patent
Clark

(10) Patent No.: US 11,242,622 B2
(45) Date of Patent: Feb. 8, 2022

(54) BULKED CONTINUOUS CARPET FILAMENT MANUFACTURING FROM POLYTRIMETHYLENE TEREPHTHALATE

(71) Applicant: Aladdin Manufacturing Corporation, Calhoun, GA (US)

(72) Inventor: Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 235 days.

(21) Appl. No.: 16/514,903

(22) Filed: Jul. 17, 2019

(65) Prior Publication Data

US 2020/0024772 A1    Jan. 23, 2020

Related U.S. Application Data

(60) Provisional application No. 62/701,388, filed on Jul. 20, 2018.

(51) Int. Cl.
*B29B 7/38* (2006.01)
*D01F 1/06* (2006.01)
(Continued)

(52) U.S. Cl.
CPC .............. *D01F 1/04* (2013.01); *B29B 7/325* (2013.01); *B29B 7/7461* (2013.01); *B29C 48/05* (2019.02);
(Continued)

(58) Field of Classification Search
CPC ......... B29B 7/325; B29B 7/38; B29B 7/7461; B29C 48/05; B29C 48/2552;
(Continued)

(56) References Cited

U.S. PATENT DOCUMENTS 1,490,918 A    4/1924  Gaede
2,146,532 A    2/1939  Crane
(Continued)

FOREIGN PATENT DOCUMENTS

AU    2013267847    3/2014
AU    2014215998    9/2014
(Continued)

OTHER PUBLICATIONS

Translation of CN 204265905 U (published on Apr. 15, 2015.*
(Continued)

*Primary Examiner* — Leo B Tentoni
(74) *Attorney, Agent, or Firm* — Brient IP Law, LLC

(57) ABSTRACT

A method of manufacturing bulked continuous carpet filament from polytrimethylene terephthalate (PTT) with polyethylene terephthalate (PET) comprises: (1) splitting the PTT stream extruded from the primary extruder into a number of polymer streams, each of the plurality of polymer streams having an associated spinning machine; (2) adding a colorant to each split polymer stream; (3) adding PET to the extruded polymer stream downstream of the primary extruder; (4) using one or more static mixing assemblies for each split polymer stream to substantially uniformly mix each split polymer stream and its respective colorant and PET; and (5) spinning each polymer stream with its substantially uniformly mixed colorant and any additives into BCF using the respective spinning machine.

17 Claims, 15 Drawing Sheets

(51) Int. Cl.

| | | |
|---|---|---|
| *D01F 6/92* | (2006.01) | |
| *D02G 3/24* | (2006.01) | |
| *D01F 1/04* | (2006.01) | |
| *D01F 6/62* | (2006.01) | |
| *D01D 5/08* | (2006.01) | |
| *B29C 48/05* | (2019.01) | |
| *B29C 48/36* | (2019.01) | |
| *D01D 1/06* | (2006.01) | |
| *D02G 3/44* | (2006.01) | |
| *B29C 48/255* | (2019.01) | |
| *D01D 1/10* | (2006.01) | |
| *B29B 7/32* | (2006.01) | |
| *B29B 7/74* | (2006.01) | |
| *B29K 105/00* | (2006.01) | |
| *B29K 67/00* | (2006.01) | |

(52) U.S. Cl.
CPC ........ *B29C 48/2552* (2019.02); *B29C 48/362* (2019.02); *D01D 1/065* (2013.01); *D01D 1/106* (2013.01); *D01D 5/08* (2013.01); *D01F 6/62* (2013.01); *D02G 3/445* (2013.01); *B29K 2067/00* (2013.01); *B29K 2067/003* (2013.01); *B29K 2105/0032* (2013.01); *B29K 2105/0088* (2013.01); *D10B 2331/04* (2013.01); *D10B 2503/04* (2013.01)

(58) Field of Classification Search
CPC .............. B29C 48/362; B29K 2067/00; B29K 2067/003; B29K 2105/0032; B29K 2105/0088; D01D 1/065; D01D 1/106; D01D 5/08; D01F 1/04; D01F 1/06; D01F 6/62; D01F 6/92; D02G 3/24; D02G 3/445; D10B 2331/04; D10B 2503/04
USPC .............. 264/103, 169, 211, 211.21, 211.22, 264/211.23, 331.18, 349
See application file for complete search history.

(56) References Cited

U.S. PATENT DOCUMENTS

| | | |
|---|---|---|
| 3,217,783 A | 11/1965 | Rodenacker |
| 3,310,837 A | 3/1967 | Wittrock |
| 3,357,049 A | 12/1967 | Spindler |
| 3,608,001 A | 9/1971 | Kowalski et al. |
| 3,825,236 A | 7/1974 | Hussmann et al. |
| 3,865,528 A | 2/1975 | Roess |
| 3,938,924 A | 2/1976 | Abella et al. |
| 4,057,376 A | 11/1977 | Berger |
| 4,057,607 A | 11/1977 | Soehngen et al. |
| 4,128,386 A | 12/1978 | Wissinger et al. |
| 4,172,477 A | 10/1979 | Reich |
| 4,192,617 A | 3/1980 | Spielhoff |
| 4,268,176 A | 5/1981 | Muller |
| 4,269,798 A | 5/1981 | Ives |
| 4,272,475 A | 6/1981 | Chi |
| 4,289,409 A | 9/1981 | Brand |
| 4,370,302 A | 1/1983 | Suzuoka et al. |
| 4,564,349 A | 1/1986 | Brown |
| 4,591,487 A | 5/1986 | Fritsch |
| 4,675,378 A | 6/1987 | Gibbon et al. |
| 4,919,872 A | 4/1990 | Fintel |
| 5,102,594 A | 4/1992 | Burlet et al. |
| 5,108,711 A | 4/1992 | Chszaniecki |
| 5,143,308 A | 9/1992 | Hally et al. |
| 5,224,383 A | 7/1993 | Pinto et al. |
| 5,225,130 A | 7/1993 | Deiringer |
| 5,266,601 A | 11/1993 | Kyber et al. |
| 5,306,803 A | 4/1994 | Arlt et al. |
| 5,339,255 A | 8/1994 | Suzuki et al. |
| 5,393,140 A | 2/1995 | Blach |
| 5,424,013 A | 6/1995 | Lieberman |
| 5,427,881 A | 6/1995 | Sacripante et al. |
| 5,459,168 A | 10/1995 | Nasr et al. |
| 5,497,562 A | 3/1996 | Pikus |
| 5,503,788 A | 4/1996 | Lazareck et al. |
| 5,510,073 A | 4/1996 | Kaegi et al. |
| 5,532,035 A | 7/1996 | Corbin et al. |
| 5,549,957 A | 8/1996 | Negola et al. |
| 5,554,657 A | 9/1996 | Brownscombe et al. |
| 5,613,285 A | 3/1997 | Chester et al. |
| 5,623,012 A | 4/1997 | Hwo |
| 5,715,584 A | 2/1998 | Coons, III et al. |
| 5,804,115 A | 9/1998 | Burton et al. |
| 5,836,682 A | 11/1998 | Blach |
| 5,886,058 A | 3/1999 | Van Erden et al. |
| 5,893,702 A | 4/1999 | Conrad et al. |
| 5,932,691 A | 8/1999 | Khanin et al. |
| 5,945,215 A | 8/1999 | Bersted et al. |
| 5,951,159 A | 9/1999 | Schobert-Csongor et al. |
| 5,958,548 A | 9/1999 | Negola et al. |
| 5,961,054 A | 10/1999 | Nishibori |
| 6,007,892 A | 12/1999 | Harwood et al. |
| 6,074,084 A | 6/2000 | Kolossow |
| 6,113,825 A | 9/2000 | Chuah |
| 6,265,533 B1 | 7/2001 | Regel et al. |
| 6,281,278 B1 * | 8/2001 | Takase ................. B29B 7/7461 524/497 |
| 6,394,644 B1 | 5/2002 | Streiff |
| 6,492,485 B1 | 12/2002 | Gohr et al. |
| 6,620,354 B1 | 9/2003 | Bessemer et al. |
| 6,627,127 B1 | 9/2003 | Piovoso et al. |
| 6,722,117 B2 | 4/2004 | Belcher, Jr. et al. |
| 6,773,718 B2 | 8/2004 | Seth et al. |
| 6,780,941 B2 | 8/2004 | Studholme et al. |
| 6,784,214 B1 | 8/2004 | Bacher et al. |
| 6,852,256 B2 | 2/2005 | Borer et al. |
| 6,866,171 B2 | 3/2005 | Ickinger |
| 6,984,694 B2 | 1/2006 | Blasius, Jr. et al. |
| 7,025,491 B2 | 4/2006 | Blach et al. |
| 7,192,545 B2 | 3/2007 | Ekart et al. |
| 7,198,400 B2 | 4/2007 | Unterlander et al. |
| 7,204,945 B2 | 4/2007 | Bonner |
| 7,262,380 B1 | 8/2007 | Ulrichsen et al. |
| 7,320,589 B2 | 1/2008 | Babin et al. |
| 7,354,988 B2 | 4/2008 | Charati et al. |
| 7,380,973 B2 | 6/2008 | Goedicke et al. |
| 7,485,685 B2 | 2/2009 | Mihan et al. |
| 7,513,677 B2 | 4/2009 | Gneuss et al. |
| 7,594,453 B2 | 9/2009 | Blach |
| 7,628,892 B2 | 12/2009 | Fini |
| 7,647,886 B2 | 1/2010 | Kubista et al. |
| 7,654,725 B2 | 2/2010 | Sturm et al. |
| 7,700,015 B2 | 4/2010 | Kern et al. |
| 7,744,788 B2 | 6/2010 | Portier et al. |
| 7,799,835 B2 | 9/2010 | Smith et al. |
| 7,828,538 B2 | 11/2010 | Fellinger |
| 7,902,262 B2 | 3/2011 | Armstrong et al. |
| 7,928,150 B2 | 4/2011 | Kannan et al. |
| 7,935,737 B2 | 5/2011 | Gopal et al. |
| 7,980,834 B2 | 7/2011 | Maguire |
| 8,080,190 B2 | 12/2011 | Ichikawa et al. |
| 8,147,738 B2 | 4/2012 | Boczon et al. |
| 8,187,512 B2 | 5/2012 | Eloo et al. |
| 8,398,752 B2 | 3/2013 | Brownstein et al. |
| 8,404,755 B2 | 3/2013 | Sequeira |
| 8,444,886 B2 | 5/2013 | Herve |
| 8,471,972 B2 | 6/2013 | Tsubata |
| 8,557,155 B2 | 10/2013 | Deiss et al. |
| 8,597,553 B1 | 12/2013 | Clark |
| 8,735,457 B2 | 5/2014 | Booth et al. |
| 8,741,972 B2 | 6/2014 | Booth et al. |
| 8,795,811 B2 | 8/2014 | Cloutier et al. |
| 9,061,442 B2 | 6/2015 | Gneuss et al. |
| 9,149,955 B2 | 10/2015 | Bower et al. |
| 9,168,718 B2 | 10/2015 | Westwood et al. |
| 9,409,363 B2 | 8/2016 | Clark |
| 9,550,338 B2 | 1/2017 | Clark |
| 9,630,353 B2 | 4/2017 | Clark |
| 9,630,354 B2 | 4/2017 | Clark |

(56) References Cited

U.S. PATENT DOCUMENTS

| | | | |
|---|---|---|---|
| 9,636,845 B2 | 5/2017 | Clark | |
| 9,636,860 B2 | 5/2017 | Clark | |
| 9,908,263 B2 | 3/2018 | Pichler et al. | |
| 9,975,278 B2 | 5/2018 | Rabiser et al. | |
| 10,124,513 B2 | 11/2018 | Clark | |
| 10,532,495 B2 | 1/2020 | Clark | |
| 2002/0086077 A1 | 7/2002 | Noller et al. | |
| 2004/0053047 A1 | 3/2004 | Jackson et al. | |
| 2004/0063860 A1* | 4/2004 | Marston | D01F 6/92 525/222 |
| 2004/0082672 A1 | 4/2004 | Zeng et al. | |
| 2004/0140248 A1 | 7/2004 | Dauzvardis et al. | |
| 2004/0155374 A1 | 8/2004 | Hutchinson et al. | |
| 2005/0047267 A1 | 3/2005 | Gneuss et al. | |
| 2005/0263941 A1 | 12/2005 | Reutter et al. | |
| 2006/0012074 A1 | 1/2006 | Booth et al. | |
| 2006/0076705 A1 | 4/2006 | Fowler et al. | |
| 2006/0284334 A1 | 12/2006 | Christel | |
| 2007/0000947 A1 | 1/2007 | Lewis et al. | |
| 2007/0009750 A1* | 1/2007 | Ito | C08J 7/08 428/458 |
| 2007/0052131 A1 | 3/2007 | Fujimaki et al. | |
| 2007/0261777 A1 | 11/2007 | Steckelberg et al. | |
| 2008/0004202 A1 | 1/2008 | Wolfgang et al. | |
| 2008/0069916 A1 | 3/2008 | Regalia | |
| 2008/0139700 A1 | 6/2008 | Roden et al. | |
| 2008/0157425 A1* | 7/2008 | Rodgers | D01F 6/92 264/176.1 |
| 2008/0214701 A1 | 9/2008 | Wilms et al. | |
| 2008/0272508 A1 | 11/2008 | Culbert et al. | |
| 2008/0274320 A1 | 11/2008 | Yokoyama et al. | |
| 2008/0292831 A1 | 11/2008 | Juriga et al. | |
| 2009/0004325 A1 | 1/2009 | Bacher et al. | |
| 2009/0039542 A1 | 2/2009 | Morton-Finger | |
| 2009/0270564 A1 | 10/2009 | Gorlier et al. | |
| 2009/0286919 A1 | 11/2009 | Moeller et al. | |
| 2010/0102475 A1 | 4/2010 | Moon et al. | |
| 2010/0113626 A1 | 5/2010 | Liu | |
| 2011/0177283 A1 | 7/2011 | Juriga | |
| 2011/0257345 A1 | 10/2011 | Hoover, Jr. et al. | |
| 2012/0070615 A1 | 3/2012 | Shi et al. | |
| 2012/0279023 A1 | 11/2012 | Burout et al. | |
| 2013/0133697 A1 | 5/2013 | Stockman et al. | |
| 2015/0069652 A1 | 3/2015 | Clark | |
| 2015/0069655 A1 | 3/2015 | Clark | |
| 2015/0076725 A1 | 3/2015 | Clark | |
| 2015/0076744 A1 | 3/2015 | Clark | |
| 2017/0136761 A1 | 5/2017 | Sieradzki et al. | |
| 2017/0152611 A1 | 6/2017 | Clark | |
| 2017/0275785 A1 | 9/2017 | Williams et al. | |
| 2018/0126595 A1 | 5/2018 | Clark | |
| 2018/0127893 A1 | 5/2018 | Clark | |
| 2018/0362723 A1 | 12/2018 | Gneuss et al. | |
| 2020/0055213 A1 | 2/2020 | Clark | |

FOREIGN PATENT DOCUMENTS

| | | | |
|---|---|---|---|
| CH | 170967 A | 8/1934 | |
| CN | 1391511 | 1/2003 | |
| CN | 101444954 | 6/2009 | |
| CN | 101778705 | 7/2010 | |
| CN | 201872322 | 6/2011 | |
| CN | 202072825 | 12/2011 | |
| CN | 102990903 | 3/2013 | |
| CN | 202986059 U | 6/2013 | |
| CN | 104040040 | 9/2014 | |
| CN | 204265905 | 4/2015 | |
| CN | 204265905 U * | 4/2015 | D01D 5/08 |
| DE | 2243024 A1 | 3/1973 | |
| DE | 3801574 | 8/1989 | |
| DE | 4433593 | 6/1995 | |
| DE | 19722278 | 12/1998 | |
| DE | 102006033089 | 10/2007 | |
| DE | 102008018686 | 10/2009 | |
| DE | 102011082769 | 3/2013 | |
| DE | 102013000316 | 7/2014 | |
| DE | 102017111275 | 11/2018 | |
| EP | 0336520 | 10/1989 | |
| EP | 0846860 A2 | 6/1998 | |
| EP | 0881054 | 12/1998 | |
| EP | 1054370 | 11/2000 | |
| EP | 1400332 | 3/2004 | |
| EP | 1434680 B1 | 7/2006 | |
| EP | 2748358 | 7/2014 | |
| EP | 3375916 | 9/2018 | |
| GB | 2059864 | 4/1981 | |
| GB | 1601699 | 11/1981 | |
| GB | 2141844 | 1/1985 | |
| JP | 63191823 | 8/1988 | |
| JP | 2003530478 | 10/2003 | |
| JP | 2007186830 | 7/2007 | |
| WO | 2001021373 | 3/2001 | |
| WO | 2002038276 | 5/2002 | |
| WO | 2003033240 | 4/2003 | |
| WO | 2004/026557 | 4/2004 | |
| WO | 2008017843 | 2/2008 | |
| WO | 2008083035 | 7/2008 | |
| WO | 2008083820 | 7/2008 | |
| WO | 2010133531 | 11/2010 | |
| WO | 2011088437 | 7/2011 | |
| WO | 2011095361 | 8/2011 | |
| WO | 2012119165 | 9/2012 | |
| WO | 2013180941 | 12/2013 | |
| WO | 2016081474 | 5/2016 | |
| WO | 2016081495 | 5/2016 | |
| WO | 2016081508 | 5/2016 | |
| WO | 2016081568 | 5/2016 | |
| WO | 2018089346 | 5/2018 | |
| WO | 2018140884 | 8/2018 | |
| WO | 2018161021 | 9/2018 | |

OTHER PUBLICATIONS

Final Office Action, dated Jun. 11, 2020, from corresponding U.S. Appl. No. 15/804,501.

Final Office Action, dated Jun. 11, 2020, from corresponding U.S. Appl. No. 16/409,599.

Gneuss website, https://www.gneuss.com/en/polymer-technologies/extrusion/mrs-extruder/, dated Jun. 5, 2020, pp. 1-4.

Final Office Action, dated Jun. 15, 2020, from corresponding U.S. Appl. No. 16/557,076.

Office Action, dated Jun. 24, 2020, from corresponding U.S. Appl. No. 16/348,117.

European Search Report, dated Apr. 28, 2020, from corresponding European Application No. 17869117.6.

Final Office Action, dated Sep. 28, 2020, from corresponding U.S. Appl. No. 16/131,397.

International Preliminary Report on Patentability, dated Mar. 26, 2020, from corresponding International Application No. PCT/US2018/051043.

Notice of Allowance, dated Apr. 9, 2020, from corresponding U.S. Appl. No. 16/684,490.

Office Action, dated Aug. 8, 2019, from corresponding U.S. Appl. No. 16/409,599.

International Preliminary Report on Patentability, dated Aug. 8, 2019, from corresponding International Application No. PCT/US2018/015751.

Office Action, dated Aug. 13, 2019, from corresponding U.S. Appl. No. 16/213,694.

Botos, J., et al., "Color Measurement of Plastics—from Compounding via Pelletizing, up to Injection Molding and Extrusion," AIP Conference Proceedings 1593, 16 (2014), https://doi.org/10.1063/1.4873725, Feb. 17, 2015.

Machado, Almir De Souza, "Fundamentals of Cast Film Extrusion Technology," https://www.slideshare.net/ASMachado/fundamentals-of-cast-film-extrusion-technology, Dec. 2, 2013.

Notice of Allowance, dated Aug. 19, 2019, from corresponding U.S. Appl. No. 16/402,583.

(56) References Cited

OTHER PUBLICATIONS

Office Action, dated Aug. 26, 2019, from corresponding U.S. Appl. No. 16/220,905.
Austrian Patent Application No. A 330/2011, filed Mar. 10, 2011, entitled "Verfahren und Vorrichtung zum Entfernen von Verunreinigungen aus einer Kunststoffschmelze".
International Search Report, dated Jul. 5, 2012, from corresponding International Application No. PCT/AT2012/000052.
International Search Report, dated Oct. 30, 2019, from corresponding International Application No. PCT/US2019/042456.
Invitation to Pay Additional Fees, dated Oct. 18, 2019, from corresponding International Application No. PCT/US2019/042458.
Office Action, dated Dec. 2, 2019, from corresponding U.S. Appl. No. 16/664,730.
Office Action, dated Nov. 25, 2019, from corresponding U.S. Appl. No. 15/804,501.
Office Action, dated Nov. 29, 2019, from corresponding U.S. Appl. No. 16/557,076.
Written Opinion of the International Searching Authority, dated Oct. 30, 2019, from corresponding International Application No. PCT/US2019/042456.
Final Office Action, dated Jan. 9, 2020, from corresponding U.S. Appl. No. 15/348,591.
International Search Report, dated Dec. 10, 2019, from corresponding International Application No. PCT/US2019/042458.
Office Action, dated Jan. 29, 2020, from corresponding U.S. Appl. No. 16/684,490.
Written Opinion of the International Searching Authority, dated Dec. 10, 2019, from corresponding International Application No. PCT/US2019/042458.
Notice of Allowance, dated Feb. 3, 2020, from corresponding U.S. Appl. No. 16/041,442.
"MRS extrusion technology offers new options in PET", Plastics Additives and Compounding, Elsevier Science, Oxofrd, GB, vol. 11, No. 2, Mar. 1, 2009 (Mar. 1, 2009), pp. 24-26, XP026067788, ISSN: 1464-391X.DOI:10.1016/S1464-391X(09)70050-9 [retrieved on Mar. 1, 2009] the whole document.
"Processing Technology: Processing of Polymer Melts," Oct. 31, 2007, Gneuss Kunststofftechnik GmbH, Dusseldorf, Germany.
Australian Office Action, dated Aug. 26, 2015, from corresponding Australian Patent Application No. 2014215998.
Australian Office Action, dated Dec. 5, 2016, from corresponding Australian Patent Application No. 2016234917.
Australian Office Action, dated May 9, 2014, from corresponding Australian Patent Application No. 2013267847.
Chinese Office Action, dated May 12, 2016, from corresponding Chinese Patent Application No. 201380003461.8.
Chinese Office Action, dated Sep. 14, 2015, from corresponding Chinese Patent Application No. 201380003461.8.
Decision of Patent Grant, dated Dec. 12, 2014, from corresponding Korean Patent Application No. 10-2014-7016621.
European Office Action, dated Dec. 12, 2016, from corresponding European Patent Application No. 15158377.0.
Ex Parte Quayle Action, dated Mar. 11, 2019, from corresponding U.S. Appl. No. 16/220,733.
Extended European Search Report, dated Aug. 26, 2015, from corresponding European Application No. 15158377.0.
Extended European Search Report, dated Jul. 24, 2018, from corresponding European Patent Application No. 18170112.9.
Final Office Action, dated Dec. 24, 2015, from corresponding U.S. Appl. No. 14/256,261.
Final Office Action, dated May 22, 2019, from corresponding U.S. Appl. No. 15/396,143.
Final Office Action, dated Oct. 19, 2016, from corresponding U.S. Appl. No. 14/546,819.
Final Office Action, dated Oct. 19, 2016, from corresponding U.S. Appl. No. 14/546,837.
Final Office Action, dated Oct. 19, 2016, from corresponding U.S. Appl. No. 14/546,847.
Final Office Action, dated Oct. 20, 2016, from corresponding U.S. Appl. No. 14/546,796.
Gneuss M: "Multi Rotation System Extruder Leads to Breakthrough in Polymer Evacuation", International Fiber Journal, International Media Group, Charlotte, NC, US, vol. 23, No. 1, Feb. 1, 2008 (Feb. 1, 2008), pp. 40-41, XP001514827, ISSN: 1049-801X the whole document.
Hannemann, Innovative Aufbereitungslösung für PET mit uneingeschränkter FDA—Lebensmittelzulassung, Presentation, Mar. 15, 2012, 37 pages total, Gneuss Kunststofftechnik GmbH, Germany.
International Preliminary Report on Patentability, dated Dec. 11, 2014, from corresponding International Application No. PCT/US2013/040753.
International Preliminary Report on Patentability, dated Dec. 2, 2014, from corresponding International Application No. PCT/US2013/040753.
International Preliminary Report on Patentability, dated Jun. 1, 2017, from corresponding International Application No. PCT/US2015/061116.
International Preliminary Report on Patentability, dated Jun. 1, 2017, from corresponding International Application No. PCT/US2015/061145.
International Preliminary Report on Patentability, dated Jun. 1, 2017, from corresponding International Application No. PCT/US2015/061174.
International Preliminary Report on Patentability, dated Jun. 1, 2017, from corresponding International Application No. PCT/US2015/061288.
International Search Report, dated Apr. 12, 2018, from corresponding International Application No. PCT/US2018/015751.
International Search Report, dated Feb. 2, 2016, from corresponding International Application No. PCT/US2015/061116.
International Search Report, dated Feb. 2, 2016, from corresponding International Application No. PCT/US2015/061145.
International Search Report, dated Feb. 5, 2016, from corresponding International Application No. PCT/US2015/061174.
International Search Report, dated Jan. 20, 2016, from corresponding International Application No. PCT/US2015/061288.
International Search Report, dated Mar. 1, 2018, from corresponding International Application Serial No. PCT/US2017/060359.
International Search Report, dated Nov. 19, 2018, from corresponding International Application No. PCT/US2018/051043.
International Search Report, dated Sep. 2, 2013, from corresponding International Application No. PCT/US2013/040753.
Invitation to Pay Additional Search Fees, dated Jan. 5, 2018, from corresponding International Application Serial No. PCT/US2017/060359.
Jaecker M: "The Conceptual Concept of the Future //Advantages of the Negative-Conical Gangti EFE on Double-Screw Extruders", Kunststoffe, Carl Hanser Verlag, Munchen, DE, vol. 99, No. 12, Dec. 1, 2000 (2000-12-91), p. 64,66, XP990976191, ISSN: 9923-5563, figure 1.
Korean Office Action, dated Aug. 18, 2014, from corresponding Korean Patent Application No. 10-2014-7016621.
Notice of Acceptance, dated Jun. 21, 2016, from corresponding Australian Patent Application No. 2014215998.
Notice of Acceptance, dated Nov. 10, 2014, from corresponding Australian Patent Application No. 2013267847.
Notice of Allowance, dated Apr. 13, 2016, from corresponding U.S. Appl. No. 14/256,261.
Notice of Allowance, dated Apr. 17, 2019, from corresponding U.S. Appl. No. 16/220,733.
Notice of Allowance, dated Dec. 13, 2018, from corresponding U.S. Appl. No. 15/473,385.
Notice of Allowance, dated Feb. 2, 2017, from corresponding U.S. Appl. No. 14/546,819.
Notice of Allowance, dated Feb. 2, 2017, from corresponding U.S. Appl. No. 14/546,837.
Notice of Allowance, dated Feb. 2, 2017, from corresponding U.S. Appl. No. 14/546,847.
Notice of Allowance, dated Feb. 3, 2017, from corresponding U.S. Appl. No. 14/546,796.

(56) References Cited

OTHER PUBLICATIONS

Notice of Allowance, dated Jan. 24, 2019, from corresponding U.S. Appl. No. 15/473,402.
Notice of Allowance, dated Jul. 5, 2018, from corresponding U.S. Appl. No. 15/204,645.
Notice of Allowance, dated May 1, 2019, from corresponding U.S. Appl. No. 15/419,955.
Notice of Allowance, dated Oct. 28, 2013, from corresponding U.S. Appl. No. 13/721,955.
International Search Report, dated Sep. 3, 2020, from corresponding International Application No. PCT/US2020/036094.
Written Opinion of the International Searching Authority, dated Sep. 3, 2020, from corresponding International Application No. PCT/US2020/036094.
Notice of Allowance, dated Feb. 12, 2020, from corresponding U.S. Appl. No. 16/220,905.
Office Action, dated Feb. 21, 2020, from corresponding U.S. Appl. No. 15/910,853.
Notice of Allowance, dated Feb. 28, 2020, from corresponding U.S. Appl. No. 16/664,730.
Notice of Allowance, dated Mar. 3, 2020, from corresponding U.S. Appl. No. 16/213,694.
Notice of Allowance, dated Apr. 29, 2020, from corresponding U.S. Appl. No. 15/348,591.
Office Action, dated May 27, 2020, from corresponding U.S. Appl. No. 16/131,397.
International Preliminary Report on Patentability, dated Sep. 12, 2019, from corresponding International Application No. PCT/US2018/020746.
Office Action, dated Sep. 12, 2019, from corresponding U.S. Appl. No. 16/432,579.
Notice of Allowance, dated Oct. 10, 2019, from corresponding U.S. Appl. No. 16/432,579.
Office Action, dated Sep. 1, 2020, from corresponding U.S. Appl. No. 16/537,844.
Final Office Action, dated Jul. 8, 2020, from corresponding U.S. Appl. No. 15/910,853.
Restriction Requirement, dated Jul. 1, 2020, from corresponding U.S. Appl. No. 16/041,586.
International Preliminary Report on Patentability, dated Feb. 4, 2021, from corresponding International Application No. PCT/US2019/042456.
International Preliminary Report on Patentability, dated Feb. 4, 2021, from corresponding International Application No. PCT/US2019/042458.
Office Action, dated Feb. 12, 2021, from corresponding U.S. Appl. No. 16/480,302.
Office Action, dated Oct. 27, 2020, from corresponding U.S. Appl. No. 16/409,599.
Restriction Requirement, dated Oct. 20, 2020, from corresponding U.S. Appl. No. 16/480,302.
Notice of Allowance, dated Feb. 25, 2021, from corresponding U.S. Appl. No. 16/664,724.
Office Action, dated Mar. 1, 2021, from corresponding U.S. Appl. No. 16/131,397.
Office Action, dated Dec. 17, 2020, from corresponding U.S. Appl. No. 15/910,853.
Final Office Action, dated Dec. 31, 2020, from corresponding U.S. Appl. No. 16/348,117.
Office Action, dated Jan. 8, 2021, from corresponding U.S. Appl. No. 16/557,076.
Notice of Allowance, dated Jan. 13, 2021, from corresponding U.S. Appl. No. 16/537,844.
Notice of Allowance, dated Sep. 12, 2016, from corresponding U.S. Appl. No. 13/892,713.
Notice of Opposition, dated Dec. 17, 2015, from corresponding European Application No. 13728264.6.
Office Action, dated Apr. 9, 2018, from corresponding U.S. Appl. No. 15/204,645.
Office Action, dated Aug. 21, 2015, from corresponding U.S. Appl. No. 14/256,261.
Office Action, dated Aug. 27, 2018, from corresponding U.S. Appl. No. 15/473,385.
Office Action, dated Aug. 27, 2018, from corresponding U.S. Appl. No. 15/473,402.
Office Action, dated Jun. 1, 2016, from corresponding U.S. Appl. No. 14/546,837.
Office Action, dated Jun. 10, 2013, from corresponding U.S. Appl. No. 13/721,955.
Office Action, dated Jun. 13, 2016, from corresponding U.S. Appl. No. 14/546,847.
Office Action, dated Jun. 22, 2016, from corresponding U.S. Appl. No. 14/546,796.
Office Action, dated Jun. 30, 2016, from corresponding U.S. Appl. No. 13/892,740.
Office Action, dated Mar. 24, 2016, from corresponding U.S. Appl. No. 13/892,713.
Office Action, dated May 26, 2016, from corresponding U.S. Appl. No. 14/546,819.
Office Action, dated May 6, 2019, from corresponding U.S. Appl. No. 15/348,591.
Office Action, dated Oct. 9, 2018, from corresponding U.S. Appl. No. 15/419,955.
Office Action, dated Sep. 7, 2018, from corresponding U.S. Appl. No. 15/396,143.
Restriction Requirement, dated Apr. 30, 2013, from corresponding U.S. Appl. No. 13/721,955.
Restriction Requirement, dated Feb. 5, 2019, from corresponding U.S. Appl. No. 16/220,733.
Schiefer,Process Engineering, Rowohlt Taschenbuch Verlag GmbH, Aug. 1972.
Vietnamese Office Action, dated Jul. 13, 2016, from corresponding Vietnamese Patent Application No. 1-2014-01079.
Wikipedia, Polyethylene terephthalate, https://en.wikipedia.org/w/index.php?title=Polyethylene_terephthalate&oldid=491494734.
Written Opinion of the International Searching Authority, dated Apr. 12, 2018, from corresponding International Application No. PCT/US2018/015751.
Written Opinion of the International Searching Authority, dated Feb. 2, 2016, from corresponding International Application No. PCT/US2015/061116.
Written Opinion of the International Searching Authority, dated Feb. 2, 2016, from corresponding International Application No. PCT/US2015/061145.
Written Opinion of the International Searching Authority, dated Feb. 5, 2016, from corresponding International Application No. PCT/US2015/061174.
Written Opinion of the International Searching Authority, dated Jan. 20, 2016, from corresponding International Application No. PCT/US2015/061288.
Written Opinion of the International Searching Authority, dated Mar. 1, 2018, from corresponding International Application Serial No. PCT/US2017/060359.
Written Opinion of the International Searching Authority, dated Nov. 19, 2018, from corresponding International Application No. PCT/US2018/051043.
Written Opinion of the International Searching Authority, dated Sep. 2, 2013, from corresponding International Application No. PCT/US2013/040753.
Office Action, dated Jun. 18, 2019, from corresponding U.S. Appl. No. 16/402,583.
Restriction Requirement, dated Jul. 15, 2019, from corresponding U.S. Appl. No. 16/432,579.
Office Action, dated Jul. 23, 2019, from corresponding U.S. Appl. No. 16/041,442.
Notice of Allowance, dated Aug. 1, 2019, from corresponding U.S. Appl. No. 15/396,143.
Office Action, dated Nov. 2, 2020, from corresponding U.S. Appl. No. 15/804,501.
Office Action, dated Nov. 18, 2020, from corresponding U.S. Appl. No. 16/664,724.

(56) References Cited

OTHER PUBLICATIONS

Advisory Action, dated Apr. 9, 2021, from corresponding U.S. Appl. No. 16/348,117.
Final Office Action, dated Apr. 27, 2021, from corresponding U.S. Appl. No. 15/910,853.
Office Action, dated May 4, 2021, from corresponding U.S. Appl. No. 16/409,599.
Restriction Requirement, dated May 17, 2021, from corresponding U.S. Appl. No. 16/514,898.
Final Office Action, dated May 25, 2021, from corresponding U.S. Appl. No. 16/480,302.
Notice of Allowance, dated Jun. 23, 2021, from corresponding U.S. Appl. No. 16/557,076.
Office Action, dated Jun. 18, 2021, from corresponding U.S. Appl. No. 16/348,117.
Office Action, dated Jun. 25, 2021, from corresponding U.S. Appl. No. 16/489,875.
Office Action, dated Jun. 25, 2021, from corresponding U.S. Appl. No. 16/816,409.
Final Office Action, dated Jul. 30, 2021, from corresponding U.S. Appl. No. 15/910,853.
Office Action, dated Aug. 6, 2021, from corresponding U.S. Appl. No. 16/518,261.
Final Office Action, dated Sep. 14, 2021, from corresponding U.S. Appl. No. 16/409,599.
Final Office Action, dated Sep. 7, 2021, from corresponding U.S. Appl. No. 16/131,397.
Office Action, dated Sep. 2, 2021, from corresponding U.S. Appl. No. 16/645,137.
Final Office Action, dated Oct. 4, 2021, from corresponding U.S. Appl. No. 16/480,302.
Office Action, dated Oct. 6, 2021, from corresponding U.S. Appl. No. 16/489,875.

* cited by examiner

BULKED CONTINUOUS CARPET FILAMENT MANUFACTURING FROM POLYTRIMETHYLENE TEREPHTHALATE

CROSS-REFERENCE TO RELATED APPLICATION

This application claims priority to U.S. Provisional Patent Application No. 62/701,388, filed Jul. 20, 2018, entitled "BULKED CONTINUOUS CARPET FILAMENT MANUFACTURING FROM POLYTRIMETHYLENE TEREPHTHALATE," the contents of which are hereby incorporated herein by reference in their entirety.

BACKGROUND

Currently, bulked continuous carpet filament (BCF) is commonly made from polymers such as polyethylene terephthalate (PET). There is currently a need for improved methods for manufacturing BCF from other polymers and/or other combinations of polymers to provide BCF with improved properties (e.g., lower flammability) at a reasonable cost.

SUMMARY

According to particular embodiments, bulked continuous carpet filament may be manufactured from polytrimethylene terephthalate (PTT) by providing an extruder, using the extruder to at least partially melt the PTT into a polymer stream and at least partially purify the polymer stream, providing a static mixing assembly downstream of the extruder, adding polyethylene terephthalate (PET) to the polymer stream downstream of the extruder and before the static mixing assembly or along a length of the static mixing assembly between an upstream end and a downstream end of the static mixing assembly, using the static mixing assembly to mix the polymer stream with the PET to create a mixed polymer stream, and forming the mixed polymer stream into bulked continuous carpet filament. A liquid colorant may be added to the polymer stream before the static mixing assembly or along the length of the static mixing assembly between the upstream end and the downstream end of the static mixing assembly. The static mixing assembly may mix the polymer stream with the PET and the liquid colorant to create a colored mixed polymer stream. The colored mixed polymer stream may be formed into the bulked continuous carpet filament. A molten polymeric masterbatch may be added to the polymer stream before the static mixing assembly or along the length of the static mixing assembly between the upstream end and the downstream end of the static mixing assembly. The static mixing assembly may mix the polymer stream with the PET and the molten polymeric masterbatch to create a colored mixed polymer stream. The colored mixed polymer stream may be formed into the bulked continuous carpet filament.

An extruder used in manufacturing bulked continuous carpet filament may be a multi-screw extruder, which may also be referred to as a multiple screw extruder.

A polymer stream may be split into a plurality of individual polymer streams downstream from the extruder (e.g., a multi-screw extruder) and a respective secondary extruder and a respective static mixing assembly may be provided for each of the individual polymer streams. Adding PET, using a static mixing assembly, and forming a mixed polymer stream into bulked continuous carpet filament may occur with respect to each stream of the plurality of individual polymer streams. A liquid colorant may be added to each stream of the plurality of individual polymer streams before the respective static mixing assembly or along the length of the respective static mixing assembly between the upstream end and the downstream end of the static mixing assembly. Each respective static mixing assembly may mix each stream of the plurality of individual polymer streams with the PET and the liquid colorant to create a respective colored mixed polymer stream and the respective colored mixed polymer stream may be formed into the bulked continuous carpet filament. A molten polymeric masterbatch may be added to each stream of the plurality of individual polymer streams. Each respective static mixing assembly may mix each stream of the plurality of individual polymer streams with the PET and the molten polymeric masterbatch to create a respective colored mixed polymer stream and the respective colored mixed polymer stream into the bulked continuous carpet filament. Molten polymeric masterbatch may be added to each stream of the plurality of individual polymer streams by adding the molten polymeric masterbatch to the respective secondary extruder. Molten polymeric masterbatch may be added to each stream of the plurality of individual polymer streams by adding the molten polymeric masterbatch before the respective static mixing assembly or along the length of the respective static mixing assembly between the upstream end and the downstream end of the respective static mixing assembly.

In multi-screw extruder embodiments, adding PET, using a static mixing assembly, and forming a mixed polymer stream into bulked continuous carpet filament may occur with respect to each stream of the plurality of individual polymer streams. In multi-screw extruder embodiments, a liquid colorant may be added to each stream of the plurality of individual polymer streams before the respective static mixing assembly or along the length of the respective static mixing assembly between the upstream end and the downstream end of the static mixing assembly. Each respective static mixing assembly may mix each stream of the plurality of individual polymer streams with the PET and the liquid colorant to create a respective colored mixed polymer stream and the respective colored mixed polymer stream may be formed into the bulked continuous carpet filament. In further multi-screw extruder embodiments, a molten polymeric masterbatch may be added to each stream of the plurality of individual polymer streams. Each respective static mixing assembly may mix each stream of the plurality of individual polymer streams with the PET and the molten polymeric masterbatch to create a respective colored mixed polymer stream and the respective colored mixed polymer stream into the bulked continuous carpet filament. In multi-screw extruder embodiments, molten polymeric masterbatch may be added to each stream of the plurality of individual polymer streams by adding the molten polymeric masterbatch to the respective secondary extruder. In other multi-screw extruder embodiments, molten polymeric masterbatch may be added to each stream of the plurality of individual polymer streams by adding the molten polymeric masterbatch before the respective static mixing assembly or along the length of the respective static mixing assembly between the upstream end and the downstream end of the respective static mixing assembly.

According to further embodiments, bulked continuous carpet filament may be manufactured from PTT by providing an extruder, using the extruder to at least partially melt the PTT into a polymer stream and at least partially purify the polymer stream, providing a static mixing assembly downstream of the extruder, adding a liquid colorant to the polymer stream before the static mixing assembly or along a length of the static mixing assembly between an upstream end and a downstream end of the static mixing assembly, using the static mixing assembly to mix the polymer stream with the liquid colorant to create a colored polymer stream, and forming the colored polymer stream into bulked continuous carpet filament. PET may be added to the polymer stream and the static mixing assembly may mix the polymer stream with the liquid colorant and the PET to create a colored mixed polymer stream that may be formed into the bulked continuous carpet filament. PET may be to the polymer stream by adding the PET to the extruder. PET may be added to the polymer stream by adding the PET before the static mixing assembly or along the length of the static mixing assembly between the upstream end and the downstream end of the static mixing assembly.

A polymer stream may be split into a plurality of individual polymer streams downstream from the extruder (e.g., multi-screw extruder). A respective secondary extruder and a respective static mixing assembly may be provided for each stream of the plurality of individual polymer streams, wherein adding the liquid colorant, using the static mixing assembly, and forming the colored polymer stream into the bulked continuous carpet filament may occur with respect to each stream of the plurality of individual polymer streams. PET may be added to each stream of the plurality of individual polymer streams and a respective static mixing assembly may mix each of the plurality of individual polymer streams with the liquid colorant and the PET to create a respective colored mixed polymer stream that may be formed into bulked continuous carpet filament. The PET may be added to each of the plurality of individual polymer streams by adding the PET before the respective static mixing assembly or along the length of the respective static mixing assembly between the upstream end and the downstream end of the respective static mixing assembly.

In multi-screw extruder embodiments, PET may be added to each stream of the plurality of individual polymer streams and a respective static mixing assembly may mix each of the plurality of individual polymer streams with the liquid colorant and the PET to create a respective colored mixed polymer stream that may be formed into bulked continuous carpet filament. The PET may be added to each of the plurality of individual polymer streams by adding the PET before the respective static mixing assembly or along the length of the respective static mixing assembly between the upstream end and the downstream end of the respective static mixing assembly.

According to further embodiments, bulked continuous carpet filament may be manufactured from PTT by providing an extruder, using the extruder to at least partially melt the PTT into a polymer stream and at least partially purify the polymer stream, providing a static mixing assembly downstream of the extruder, adding a molten polymeric masterbatch to the polymer stream before the static mixing assembly or along a length of the static mixing assembly between an upstream end and a downstream end of the static mixing assembly, using the static mixing assembly to mix the polymer stream with the molten polymeric masterbatch to create a colored polymer stream, and forming the colored polymer stream into bulked continuous carpet filament. PET may be added to the polymer stream and the static mixing assembly may mix the polymer stream with the molten polymeric masterbatch and the PET to create a colored mixed polymer stream that may be formed into the bulked continuous carpet filament.

A polymer stream may be split into a plurality of individual polymer streams downstream from the extruder (e.g., multi-screw extruder). A respective secondary extruder and a respective static mixing assembly may be provided for each stream plurality of individual polymer streams, where adding the molten polymeric masterbatch, using the static mixing assembly, and forming the colored polymer stream into the bulked continuous carpet filament may occur with respect to each stream of the plurality of individual polymer streams. PET may be added to each stream of the plurality of individual polymer streams and the respective static mixing assembly may mix each stream of the plurality of individual polymer streams with the molten polymeric masterbatch and the PET to create a respective colored mixed polymer stream that may be formed into bulked continuous carpet filament. The PET may be added to each stream of the plurality of individual polymer streams by adding the PET to the respective secondary extruder. The PET may be added to each of the plurality of individual polymer streams by adding the PET before the respective static mixing assembly or along the length of the respective static mixing assembly between the upstream end and the downstream end of the respective static mixing assembly.

In multi-screw extruder embodiments, PET may be added to each stream of the plurality of individual polymer streams and the respective static mixing assembly may mix each stream of the plurality of individual polymer streams with the molten polymeric masterbatch and the PET to create a respective colored mixed polymer stream that may be formed into bulked continuous carpet filament. The PET may be added to each stream of the plurality of individual polymer streams by adding the PET to the respective secondary extruder. The PET may be added to each of the plurality of individual polymer streams by adding the PET before the respective static mixing assembly or along the length of the respective static mixing assembly between the upstream end and the downstream end of the respective static mixing assembly.

Various embodiments are also described in the following listing of concepts:

1. A method of manufacturing bulked continuous carpet filament from polytrimethylene terephthalate (PTT), the method comprising:

providing an extruder;

using the extruder to at least partially melt the PTT into a polymer stream and at least partially purify the polymer stream;

providing a static mixing assembly downstream of the extruder;

adding polyethylene terephthalate (PET) to the polymer stream downstream of the extruder and before the static mixing assembly or along a length of the static mixing assembly between an upstream end and a downstream end of the static mixing assembly;

using the static mixing assembly to mix the polymer stream with the PET to create a mixed polymer stream; and forming the mixed polymer stream into bulked continuous carpet filament.

2. The method of concept 1, further comprising adding a liquid colorant to the polymer stream before the static mixing assembly or along the length of the static mixing assembly between the upstream end and the downstream end of the static mixing assembly, wherein using the static mixing assembly to mix the polymer stream with the PET to create the mixed polymer stream comprises using the static mixing assembly to mix the polymer stream with the PET and the liquid colorant to create a colored mixed polymer stream, and wherein forming the mixed polymer stream into the bulked continuous carpet filament comprises forming the colored mixed polymer stream into the bulked continuous carpet filament.

3. The method of concept 1, further comprising adding a molten polymeric masterbatch to the polymer stream before the static mixing assembly or along the length of the static mixing assembly between the upstream end and the downstream end of the static mixing assembly, wherein using the static mixing assembly to mix the polymer stream with the PET to create the mixed polymer stream comprises using the static mixing assembly to mix the polymer stream with the PET and the molten polymeric masterbatch to create a colored mixed polymer stream, and wherein forming the mixed polymer stream into the bulked continuous carpet filament comprises forming the colored mixed polymer stream into the bulked continuous carpet filament.

4. The method of concept 1, wherein the extruder optionally comprises a multi-screw extruder, the method further comprising:

splitting the polymer stream into a plurality of individual polymer streams downstream from the extruder; and providing, for each stream of the plurality of individual polymer streams, a respective secondary extruder and a respective static mixing assembly, wherein adding the PET, using the static mixing assembly, and forming the mixed polymer stream into bulked continuous carpet filament occurs with respect to each stream of the plurality of individual polymer streams.

5. The method of concept 4, further comprising adding a liquid colorant to each stream of the plurality of individual polymer streams before the respective static mixing assembly or along the length of the respective static mixing assembly between the upstream end and the downstream end of the static mixing assembly, wherein using the static mixing assembly to mix the polymer stream with the PET to create the mixed polymer stream comprises using the respective static mixing assembly to mix each stream of the plurality of individual polymer streams with the PET and the liquid colorant to create a respective colored mixed polymer stream, and wherein forming the mixed polymer stream into the bulked continuous carpet filament comprises forming the respective colored mixed polymer stream into the bulked continuous carpet filament.

6. The method of concept 4, further comprising adding a molten polymeric masterbatch to each stream of the plurality of individual polymer streams, wherein using the static mixing assembly to mix the polymer stream with the PET to create the mixed polymer stream comprises using the respective static mixing assembly to mix each stream of the plurality of individual polymer streams with the PET and the molten polymeric masterbatch to create a respective colored mixed polymer stream, and wherein forming the mixed polymer stream into the bulked continuous carpet filament comprises forming the respective colored mixed polymer stream into the bulked continuous carpet filament.

7. The method of concept 6, wherein adding the molten polymeric masterbatch to each stream of the plurality of individual polymer streams comprises adding the molten polymeric masterbatch to the respective secondary extruder.

8. The method of concept 6, wherein adding the molten polymeric masterbatch to each stream of the plurality of individual polymer streams comprises adding the molten polymeric masterbatch before the respective static mixing assembly or along the length of the respective static mixing assembly between the upstream end and the downstream end of the respective static mixing assembly.

9. A method of manufacturing bulked continuous carpet filament from polytrimethylene terephthalate (PTT), the method comprising:

providing an extruder;

using the extruder to at least partially melt the PTT into a polymer stream and at least partially purify the polymer stream;

providing a static mixing assembly downstream of the extruder;

adding a liquid colorant to the polymer stream before the static mixing assembly or along a length of the static mixing assembly between an upstream end and a downstream end of the static mixing assembly;

using the static mixing assembly to mix the polymer stream with the liquid colorant to create a colored polymer stream; and forming the colored polymer stream into bulked continuous carpet filament.

10. The method of concept 9, further comprising adding polyethylene terephthalate (PET) to the polymer stream;

wherein using the static mixing assembly to mix the polymer stream with the liquid colorant to create the colored polymer stream comprises using the static mixing assembly to mix the polymer stream with the liquid colorant and the PET to create a colored mixed polymer stream, and wherein forming the colored polymer stream into the bulked continuous carpet filament comprises forming the colored mixed polymer stream into the bulked continuous carpet filament.

11. The method of concept 10, wherein adding the PET to the polymer stream comprises adding the PET to the extruder.

12. The method of concept 10, wherein adding the PET to the polymer stream comprises adding the PET before the static mixing assembly or along the length of the static mixing assembly between the upstream end and the downstream end of the static mixing assembly.

13. The method of concept 9, wherein the extruder optionally comprises a multi-screw extruder, the method further comprising:

splitting the polymer stream into a plurality of individual polymer streams downstream from the extruder; and providing, for each stream of the plurality of individual polymer streams, a respective secondary extruder and a respective static mixing assembly, wherein adding the liquid colorant, using the static mixing assembly, and forming the colored polymer stream into the bulked continuous carpet filament occurs with respect to each stream of the plurality of individual polymer streams.

14. The method of concept 13, further comprising adding polyethylene terephthalate (PET) to each stream of the plurality of individual polymer streams, wherein using the static mixing assembly to mix the polymer stream with the liquid colorant to create the colored polymer stream comprises using the respective static mixing assembly to mix each stream of the plurality of individual polymer streams with the liquid colorant and the PET to create a respective colored mixed polymer stream, and wherein forming the colored polymer stream into the bulked continuous carpet filament comprises forming the respective colored mixed polymer stream into the bulked continuous carpet filament.

15. The method of concept 14, wherein adding the PET to each stream of the plurality of individual polymer streams comprises adding the PET before the respective static mixing assembly or along the length of the respective static mixing assembly between the upstream end and the downstream end of the respective static mixing assembly.

16. A method of manufacturing bulked continuous carpet filament from polytrimethylene terephthalate (PTT), the method comprising:

providing an extruder;

using the extruder to at least partially melt the PTT into a polymer stream and at least partially purify the polymer stream;

providing a static mixing assembly downstream of the extruder;

adding a molten polymeric masterbatch to the polymer stream before the static mixing assembly or along a length of the static mixing assembly between an upstream end and a downstream end of the static mixing assembly;

using the static mixing assembly to mix the polymer stream with the molten polymeric masterbatch to create a colored polymer stream; and forming the colored polymer stream into bulked continuous carpet filament.

17. The method of concept 16, further comprising adding polyethylene terephthalate (PET) to the polymer stream, wherein using the static mixing assembly to mix the polymer stream with the molten polymeric masterbatch to create the colored polymer stream comprises using the static mixing assembly to mix the polymer stream with the molten polymeric masterbatch and the PET to create a colored mixed polymer stream, and wherein forming the colored polymer stream into the bulked continuous carpet filament comprises forming the colored mixed polymer stream into the bulked continuous carpet filament.

18. The method of concept 16, wherein the extruder optionally comprises a multi-screw extruder, the method further comprising:

splitting the polymer stream into a plurality of individual polymer streams downstream from the extruder; and providing, for each stream of the plurality of individual polymer streams, a respective secondary extruder and a respective static mixing assembly, wherein adding the molten polymeric masterbatch, using the static mixing assembly, and forming the colored polymer stream into the bulked continuous carpet filament occurs with respect to each stream of the plurality of individual polymer streams.

19. The method of concept 18, further comprising adding polyethylene terephthalate (PET) to each stream of the plurality of individual polymer streams, wherein using the static mixing assembly to mix the polymer stream with the molten polymeric masterbatch to create the colored polymer stream comprises using the respective static mixing assembly to mix each stream of the plurality of individual polymer streams with the molten polymeric masterbatch and the PET to create a respective colored mixed polymer stream, and wherein forming the colored polymer stream into the bulked continuous carpet filament comprises forming the respective colored mixed polymer stream into the bulked continuous carpet filament.

20. The method of concept 19, wherein adding the PET to each stream of the plurality of individual polymer streams comprises adding the PET to the respective secondary extruder.

Using a static mixing assembly according to all aspects, concepts, and embodiments disclosed herein is preferably used to substantially thoroughly mix the components passing through the static mixing assembly. As used herein, "substantially thoroughly mixing" should be understood to refer to mixing that results in a mixture that, upon exiting the static mixing assembly, has an identical composition throughout. That is, when samples of the resulting mixture are taken at different positions relative to the downstream end of the static mixing assembly, each sample should have an identical, or substantially identical, composition.

BRIEF DESCRIPTION OF THE DRAWINGS

Having described various embodiments in general terms, reference will now be made to the accompanying drawings, which are not necessarily drawn to scale, and wherein.

DETAILED DESCRIPTION OF VARIOUS EMBODIMENTS

Figure 1:
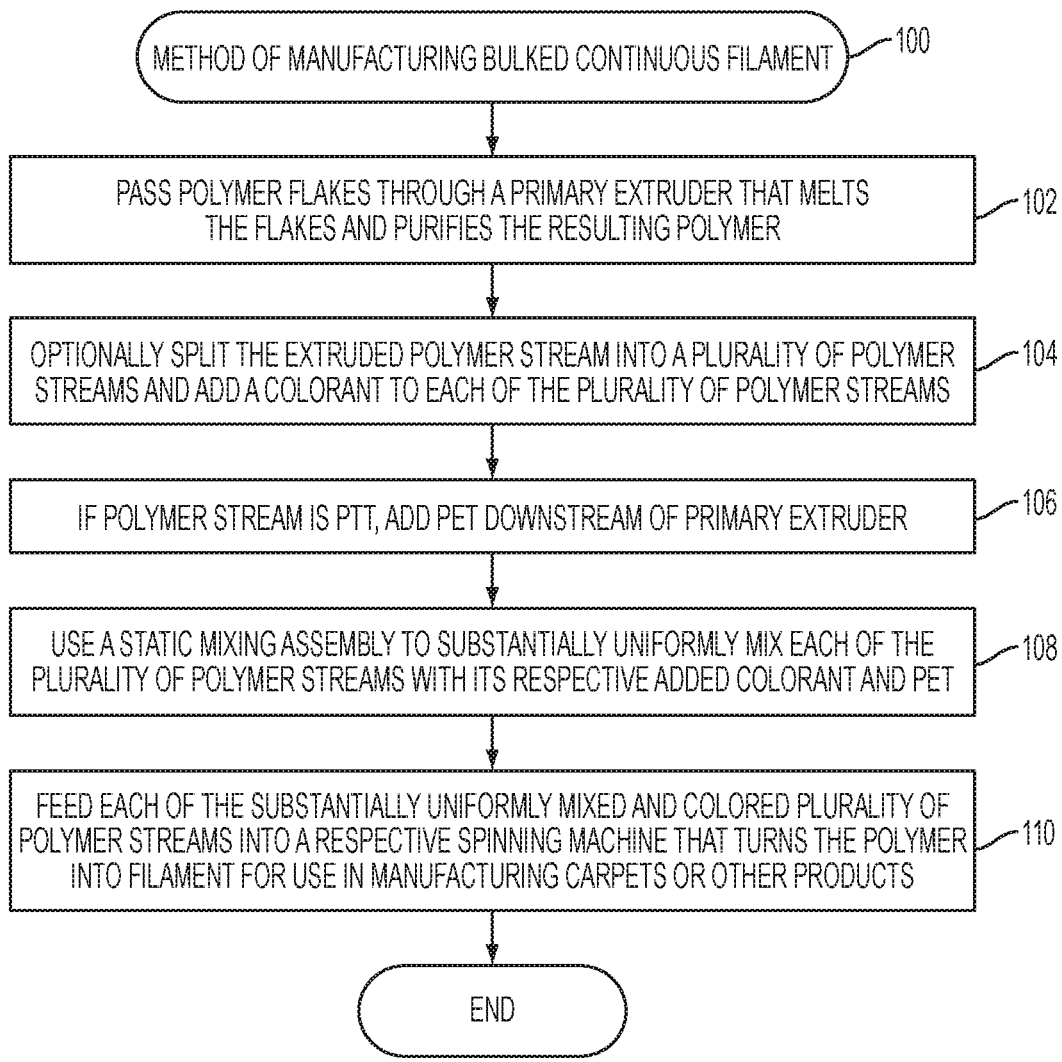
FIG. 1 depicts a high-level overview of a manufacturing process for producing and coloring bulked continuous filament, according to various embodiments described herein.

Various embodiments will now be described in greater detail. It should be understood that the disclosure herein may be embodied in many different forms and should not be construed as limited to the embodiments set forth below. Rather, these embodiments are provided so that this disclosure will be thorough and complete, and will fully convey the scope of the disclosure to those skilled in the art. Like numbers refer to like elements throughout.

Overview

New processes for producing and coloring fiber from recycled polymer (e.g., recycled PET polymer), virgin polymer (e.g., virgin PET polymer), and combinations of PTT and PET polymer are described below. In various embodiments, these new processes may include, for example: (1) extruding a polymer (e.g., such as PET or PTT) using a primary extruder; (2) adding a liquid colorant to the extruded polymer downstream from the primary extruder and/or adding molten polymeric masterbatch to the extruded polymer downstream from the primary extruder; (3) changing a color probe within a color injection port while maintaining the flow of the extruded polymer stream at the polymer stream pressure; (4) adding other polymers (e.g., such as PET) to the extruded polymer stream if the extruded polymer stream is substantially PTT; (5) using one or more static mixing elements (e.g., up to 36 static mixing elements or more) to substantially uniformly mix the extruded polymer, any added liquid colorant, any added polymeric masterbatch, and any added PET; and (6) using a spinning machine to spin the uniformly mixed extruded polymer and added colorant/PTT into bulked continuous filament (BCF) that has a color that is based on the added colorant and/or masterbatch. The process described herein may, for example, reduce an amount of waste related to changing a color of BCF produced using a particular extruder when switching to a different coloring agent (e.g., a colorant for generating a different color or a polymeric masterbatch for generating a different color). Note that as used herein, the term "colorant" refers, for example, to any colorant, coloring agent, or coloring additive, in any form (e.g., solid, liquid, molten, etc.), for altering the color of a polymer, including, but not limited to, liquid colorant, fully compounded colorant, raw colorant material, and polymeric masterbatch.

In various embodiments, the primary extruder comprises a multi-rotating screw extruder (MRS extruder). In particular embodiments, the process may further include, for example, one or more of: (1) splitting the molten polymer stream extruded from the primary extruder into a plurality of polymer streams (e.g., up to six polymer streams), each of the plurality of polymer streams having an associated spinning machine; (2) adding a colorant to each split polymer stream and/or adding molten polymeric masterbatch to each split polymer stream; (3) adding other polymers (e.g., such as PET) to each split polymer stream if the respective polymer stream is substantially PTT; (4) using one or more static mixing assemblies for each split polymer stream to substantially uniformly mix each split polymer stream and its respective colorant and other additives; and (5) spinning each polymer stream with its substantially uniformly mixed colorant and any additives into BCF using the respective spinning machine. In such embodiments, a process for producing and coloring bulked continuous filament may utilize a single primary extruder to produce a plurality of different colored filaments (e.g., carpet yarn).

In various embodiments, this new process may, for example: (1) produce less waste than other processes when producing or changing a color of BCF produced using a particular extruder, saving time, money, and product; (2) facilitate the production of small batches of particular colors of filament (e.g., for use in rugs or less popular colors of carpet) at a relatively low cost; (3) increase a number of simultaneous filament colors that a single extruder can produce; (4) allow for flexibility in manufacturing equipment and production line configurations while maintaining a satisfactory mix time for a PET and PTT mixture prior to spinning; and (5) otherwise streamline the manufacture of PET and PTT carpet filament, while providing for multiple colorant capabilities.

The various embodiments below will be described in both the context of utilizing virgin or recycled PET polymer to create BCF and in the context of utilizing PTT to create BCF. When virgin or recycled PET is used to create BCF, additional polymers may not be added, while colorant and/or polymeric masterbatch may be added. Alternatively, when making BCF using PTT, other polymers may be added to improve flammability and other characteristics of the resulting BCF. In embodiments where other polymers are added to PTT, colorant and/or polymeric masterbatch may also be added. Various embodiments herein will be described in the context of adding PET to a PTT stream. When PET or other polymers are added to a stream of PTT and the mixture undergoes extrusion and mixing for an extended time period, a chemical process called transesterification may occur. Transesterification results in a mixture that is difficult to spin in the spinning machines.

Traditionally, transesterification is a factor because the time between adding PET to the PTT stream and spinning the resulting polymer stream into BCF (this time period will be referred to herein as the "hold up time") is such that the transesterification may occur. However, when utilizing production lines that employ a primary extruder on a primary line before splitting the primary line into a number of secondary lines, each with secondary extruders and static mixing assemblies, as described in the various embodiments below, transesterification may impede the spinning process. Accordingly, rather than adding PET or other polymers to the PTT stream at the primary extruder, as is traditionally done, embodiments described below provide for the addition of PET or other polymers to the PTT stream downstream of the primary extruder. The PET addition may occur at the secondary extruders, at the static mixing assemblies, or within the static mixing assemblies (e.g., or in one or more dynamic mixing assemblies). Adding PET or other polymers to the PTT stream downstream of the primary extruder can significantly shorten the holdup time, which may improve the characteristics of the mixed polymer stream prior to spinning the polymer mixture into BCF.

According to other aspects of the disclosure below, systems and methods provide for improved colorant additions to polymer streams and color injection ports that allow for the removal and replacement of color probes and/or color probe channel plugs without requiring a shutdown of the production line. Embodiments herein provide for liquid colorant injections into a centered position (or other position) of the polymer stream while maintaining laminar flow characteristics of the polymer stream. Embodiments herein also provide for polymeric masterbatch injections into a centered position of the polymer stream while maintaining laminar flow characteristics of the polymer stream. Color injection ports and assemblies accurately place the color probe within the polymer stream while providing for retraction and insertion of the color probe while maintaining the polymer stream at the desired polymer stream pressure. The color injection ports and assemblies prevent a backflow of the polymer stream through the color injection port when the color probe is removed and replaced (e.g., by another color probe or by a plug). In this manner, the production line may continue to run during color probe replacement and color probe channel plugging, saving the significant amount of time and corresponding costs associated with stopping and starting the production line that is required in conventional color probe replacements.

More Detailed Discussion

FIG. 1 depicts a high-level overview of BCF manufacturing process 100 for producing and coloring BCF, for example, for use in the production of carpet and other products. The BCF manufacturing process, according to various embodiments, may generally be broken down into five operations: (1) passing polymer flakes (e.g., PET or PTT) through an extruder that melts the flakes and purifies the resulting polymer (operation 102) to create a polymer stream; (2) optionally splitting the extruded polymer stream into a plurality of polymer streams and adding a colorant (e.g., a liquid colorant or molten polymeric masterbatch) to each of the plurality of polymer streams (operation 104); (3) adding PET downstream of the primary extruder if the polymer stream is PTT (operation 106) (if the polymer stream is PET, according to one embodiment, no further PET or other polymers may be added); (4) using one or more static mixing assemblies to substantially uniformly mix each of the plurality of polymer streams with its respective added colorant and PET, if applicable (operation 108); and (5) feeding each of the substantially uniformly mixed and colored plurality of polymer streams into a respective spinning machine that turns the polymer into filament for use in manufacturing carpets (operation 110). These five operations are described in greater detail below.

Operation 1: Using an Extrusion System to Melt and Purify PET or PTT

In various embodiments, the operation of using an extrusion system to melt and purify PET (e.g., PET flakes and/or pellets) or PTT may include preparing the PET or PTT for extrusion and using a suitable extruder to melt and purify the PET or PTT. As discussed above, the embodiments herein apply to both the processing of PET into BCF and the processing of PTT into BCF, as well as the processing of a mixed polymer (e.g., a polymer mixture that includes both PTT and PET) into BCF. It should be understood that the embodiments described with respect to the preparation and processing of PET and with respect to the preparation and processing of PTT are interchangeable, with minor exceptions. In other words, if a process is described with respect to processing a PET stream into a colored BCF product, it should be appreciated that the same process applies to a PTT stream, unless described otherwise.

Such exceptions may include the processing of recycled PET preparation and the addition of PET to a PTT stream. The discussion of preparing recycled consumer materials into PET flakes to create a PET stream does not apply to PTT since PTT does not originate from recycled consumer materials. Moreover, when discussing the processing of a PTT stream into a colored BCF product, PET may be added as described herein in order to improve the flammability and other characteristics of the resulting product. The addition of PET may not be applicable to the processing of a PET stream as there would be little benefit to doing so.

A. Preparing PET or PTT for Extrusion

In particular embodiments, the operation of preparing the PET for extrusion may vary based on a source of the PET. For example, in various embodiments, the process may utilize: (1) virgin PET (e.g., in the form of virgin PET pellets); (2) recycled PET (e.g., in the form of recycled PET flakes ground from recycled PET bottles and other suitable sources); and/or (3) a combination of virgin and recycled PET. In various embodiments utilizing recycled PET, the operation of preparing such PET for extrusion may include sorting, grinding, washing, and/or other operations designed to remove any (e.g., some) impurities from the recycled PET prior to extrusion. These other PET preparation operations may, for example, be unnecessary in embodiments of the process that utilize virgin PET or that utilize PTT. Because using recycled PET in the process described herein may result in additional costs savings beyond those associated with a reduction in waste due to colorant changing as described herein, the processes described herein may particularly focus on the use of recycled PET, but should not be understood to limit the disclosed embodiments to recycled PET only.

In a particular embodiment, preparing the PET for extrusion may include preparing flakes of PET polymer from post-consumer bottles or other sources of recycled PET. An exemplary process for preparing post-consumer bottles for use in the production of bulked continuous filament is described in U.S. Pat. No. 8,597,553, entitled "Systems and Methods for Manufacturing Bulked Continuous Filament," which is hereby incorporated herein in its entirety. The operation of preparing flakes of PET polymer from post-consumer bottles may include, for example: (A) sorting post-consumer PET bottles and grinding the bottles into flakes; (B) washing the flakes; and (C) identifying and removing any impurities or impure flakes.

Sorting Post-Consumer PET bottles and Grinding the Bottles into Flakes

In various embodiments, bales of clear and mixed colored recycled post-consumer (e.g., "curbside") PET bottles (or other containers) obtained from various recycling facilities may be used as a source of post-consumer PET containers for use in the disclosed systems and processes. In other embodiments, the source of the post-consumer PET containers may be returned "deposit" bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., polyvinyl chloride (PVC), polylactide (PLA), polypropylene (PP), polyethylene (PE), polystyrene (PS), polyamide (PA), etc.), metal (e.g., ferrous metal, non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the bottles or containers via a rotating trammel. Various metal removal magnets and eddy current systems may be incorporated into the process to remove any metal contaminants.

In particular embodiments, the sorted material may be taken through a granulation operation (e.g., using a 50B Granulator machine from Cumberland Engineering Corporation of New Berlin, Wis.) to render, grind, shred, and/or otherwise size reduce the bottles or containers down to a size, for example, of less than one half of an inch. Near Infra-Red optical sorting equipment such as a NRT Multi Sort IR machine from Bulk Handling Systems Company of Eugene, Oreg., or the Spyder IR machine from National Recovery Technologies of Nashville, Tenn., may be utilized to remove any loose polymeric contaminants that may be mixed in with the resultant "dirty flake" (e.g., the PET flakes formed during the granulation operation) (e.g., PVC, PLA, PP, PE, PS, and PA). Additionally, or instead, automated X-ray sorting equipment such as a VINYLCYCLE machine from National Recovery Technologies of Nashville, Tenn. may be utilized to remove contaminants from the resultant dirty flake. Additionally, or instead, automated color sorting equipment equipped with a camera detection system such as a Multisort ES machine from National Recovery Technologies of Nashville, Tenn. may be utilized to remove contaminants from the resultant dirty flake. Additionally, or instead, any labels or other remaining waste may be removed from the resultant dirty flake via an air separation system prior to entering the wash process.

Washing the Flakes

In various embodiments, dirty flake may then be mixed into a series of wash tanks. As part of the wash process, in various embodiments, an aqueous density separation may be utilized to separate bottle caps (e.g., olefin bottle caps) which may, for example, be present in the dirty flake as remnants from recycled PET bottles from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the washed PET polymer flakes may be dried as an initial step in reducing the water content of the flakes. The flake may be centrifugally dewatered and then dried with hot air to at least substantially remove any surface moisture. To further dry the flakes, the system may place the flakes into a pre-conditioner for between about 20 and about 40 minutes (e.g., about 30 minutes) during which a pre-conditioner may blow the surface water off of the flakes.

The resultant "clean flake" may then be processed through an electrostatic separation system (e.g., an electrostatic separator from Carpco, Inc. of Jacksonville, Fla.) and/or a flake metal detection system (e.g., an MSS Metal Sorting System) to further remove any metal contaminants that remain in the flake. In particular embodiments, an air separation operation may remove any remaining label fragments that may be remaining from the clean flake. In various embodiments, the flake may be color sorted using a flake color sorting step (e.g., using an OPTIMIX machine from TSM Control Systems of Dundalk, Ireland) to remove any color contaminants that may be remaining in the flake. In various embodiments, an electro-optical flake sorter based at least in part on Raman technology (e.g., a Powersort 200 from Unisensor Sensorsysteme GmbH of Karlsruhe, Germany) may perform a polymer separation to remove any non-PET polymers remaining in the flake. This operation may also further remove any remaining metal contaminants and color contaminants.

In various embodiments, the combination of these steps may deliver substantially clean (e.g., clean) PET bottle flake comprising less than about 50 parts per million PVC (e.g., 25 ppm PVC) and less than about 15 parts per million metals for use in the downstream extrusion process described below.

Identifying and Removing Impurities and Impure Flakes

In various embodiments, after the flakes are washed, they are fed down a conveyor and scanned with a high-speed laser system for further contaminant removal. In various embodiments, one or more particular lasers may be configured to detect the presence of particular contaminants (e.g., PVC, aluminum). Flakes that are identified as not consisting essentially of PET polymer may be blown from the main stream of flakes with air jets. In various embodiments, the resulting proportion of non-PET flakes may be less than 25 ppm.

In various embodiments, the system may be adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water may remain within the flakes. In various embodiments, such "wet" flakes (e.g., flakes comprising interstitial water) may be processed using an extruder (e.g., as described in regard to various embodiments herein) that may include a vacuum setup designed to remove—among other things—the interstitial water that remains present in the flakes following the relatively quick drying process.

Using an Extrusion System to Melt and Purify PET or PTT Flakes

Figure 2:
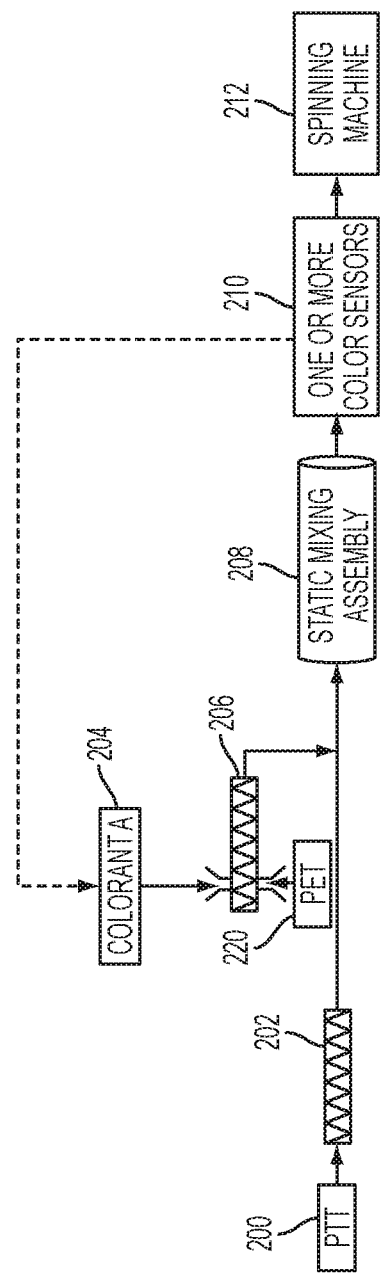
FIG. 2 depicts a process flow, according to a particular embodiment, for adding a colorant and PET to a stream of molten polymer downstream from a first extruder, according to various embodiments described herein.

FIG. 2 depicts an exemplary process flow for producing BCF with an added colorant (e.g., liquid colorant, solid colorant, molten liquid polymeric masterbatch, liquid polymeric masterbatch, solid polymeric masterbatch, compounded coloring material, etc.) according to particular embodiments. As shown in FIG. 2, in various embodiments, a suitable primary extruder 202 may be used to receive, melt, and purify PTT 200, such as any suitable PTT 200 prepared in any manner described above. In a particular embodiment, the primary extruder 202 comprises any suitable extruder such as, for example, a multiple screw extruder (e.g., a Multiple Rotating Screw ("MRS") extruder such as the MRS extruder described in U.S. Pat. No. 7,513,677, entitled "Extruder for Producing Molten Plastic Materials," which is hereby incorporated herein by reference), a twin screw extruder, a multiple screw extruder, a planetary extruder, or any other suitable multiple screw extrusion system). An exemplary multiple screw extruder 400 is shown in FIGS. 3 and 4.

Figure 3:
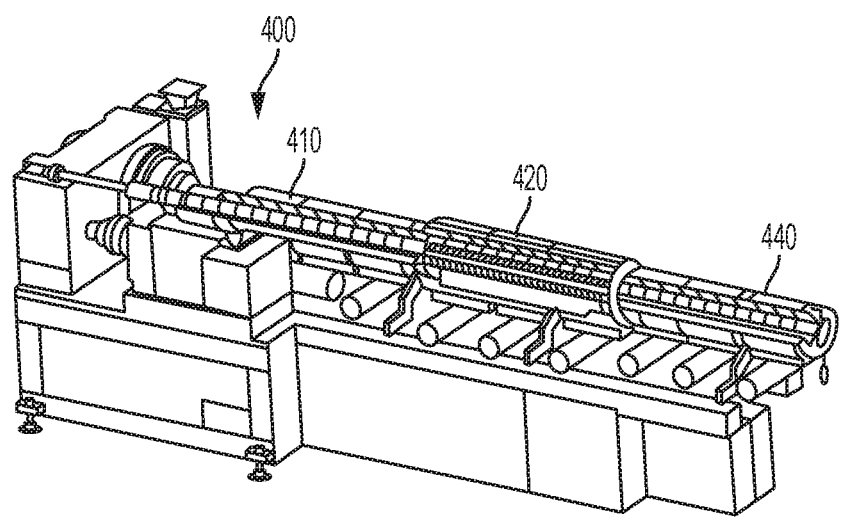
FIG. 3 is a perspective view of a multiple screw extruder that is suitable for use as the first extruder of FIG. 2, according to various embodiments described herein.
Figure 4:
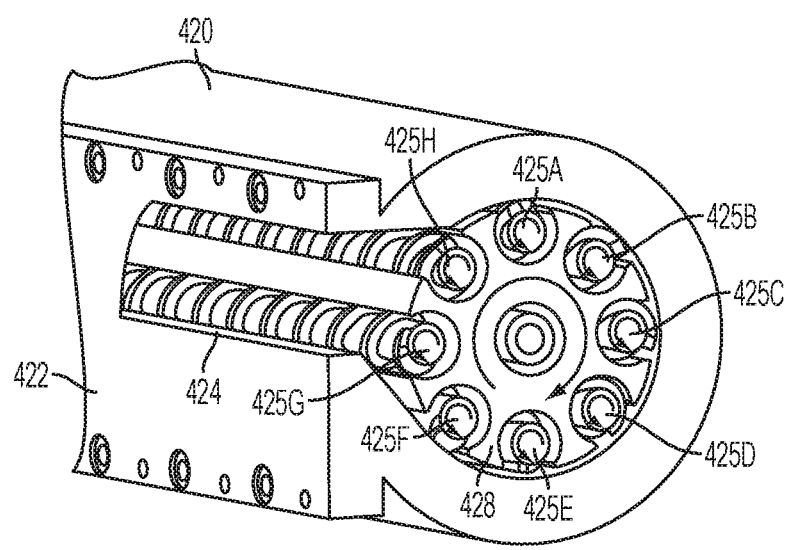
FIG. 4 is a cross-sectional view of an exemplary multiple screw section of the multiple screw extruder of FIG. 2, according to various embodiments described herein.

As may be understood from FIGS. 3 and 4, in particular embodiments, the multiple screw extruder includes a first single-screw extruder section 410 for feeding material into a multiple screw section 420 and a second single-screw extruder section 440 for transporting material away from the MRS section.

As may be understood from FIG. 3, in various embodiments, PET may first be fed through the multiple screw extruder's first single-screw extruder section 410, which may, for example, generate sufficient heat (e.g., via shearing) to at least substantially melt (e.g., melt) the wet flakes.

The resultant polymer stream (e.g., of melted PET), in various embodiments, may then be fed into the extruder's multiple screw section 420, in which the extruder separates the polymer flow into a plurality of different polymer streams (e.g., 4, 5, 6, 7, 8, or more streams) through a plurality of open chambers. FIG. 4 shows a detailed cutaway view of a multiple screw section 420 according to a particular embodiment. In various embodiments, such as the embodiment shown in this figure, the multiple screw section 420 (e.g., MRS section) separates the polymer flow into eight different streams, which are subsequently fed through eight satellite screws 425A-H. As may be understood from FIGS. 3 and 4, in particular embodiments, these satellite screws are substantially parallel (e.g., parallel) to one other and to a primary screw axis of the multiple screw extruder 400.

As shown in FIG. 4, in various embodiments the satellite screws 425A-H may be arranged within a single screw drum 428 that is mounted to rotate about its central axis. The satellite screws 425A-H may be configured to rotate in a direction that is opposite to the direction in which the single screw drum 428 rotates. In various other embodiments, the satellite screws 425A-H and the single screw drum 428 may rotate in the same direction. In various embodiments, the rotation of the satellite screws 425A-H may be driven by a ring gear. In some particular embodiments, the single screw drum 428 may rotate about four times faster than each individual satellite screw 425A-H. In certain other particular embodiments, the satellite screws 425A-H rotate at substantially similar (e.g., the same) speeds.

In various embodiments, as may be understood from FIG. 4, the satellite screws 425A-H are housed within respective extruder barrels, which may, for example, be about 30% open to an outer chamber of the multiple screw section 420. In particular embodiments, the rotation of the satellite screws 425A-H and single screw drum 428 increases the surface exchange of the polymer stream (e.g., exposes more surface area of the melted polymer to the open chamber than in previous systems). In various embodiments, the multiple screw section 420 may create a melt surface area that is, for example, between about 20 and about 30 times greater than the melt surface area created by a co-rotating twin screw extruder. In a particular embodiment, the multiple screw section 420 may create a melt surface area that is, for example, about twenty-five times greater than the melt surface area created by a co-rotating twin screw extruder.

In various embodiments, the multiple screw extruder's multiple screw section 420 may be fitted with a vacuum pump that may be attached to a vacuum attachment portion 422 of the multiple screw section 420 so that the vacuum pump is in communication with the interior of the multiple screw section via a suitable opening 424 in the multiple screw section's housing. In still other embodiments, the multiple screw section 420 may be fitted with a series of vacuum pumps. In particular embodiments, the vacuum pump is configured to reduce the pressure within the interior of the multiple screw section 420 to a pressure that is between about 0.5 millibars and about 25 millibars. In other particular embodiments, the vacuum pump is configured to reduce the pressure in the multiple screw section 420 to less than about 5 millibars (e.g., about 1.8 millibars or less). In other particular embodiments, the vacuum pump is configured to reduce the pressure in the multiple screw section 420 to between about 0 millibar and about 1.5 millibars (e.g., between about 0 millibar and about 1 millibar). In other particular embodiments, the vacuum pump is configured to reduce the pressure in the multiple screw section 420 to between about 0.5 millibars and about 1.2 millibars. In other particular embodiments, the vacuum pump is configured to reduce the pressure in the multiple screw section 420 to between about 0 millibar and about 5 millibars. In a particular embodiment, the vacuum pump used with extruder 400 is a jet vacuum pump is made by Arpuma GmbH of Bergheim, Germany.

The low-pressure vacuum in the multiple screw section 420 created by the vacuum pump in the multiple screw section 420 (e.g., MRS section) may remove, among other things, volatile organics present in the melted polymer as the melted polymer passes through the multiple screw section 420 and/or at least a portion of any interstitial water that was present in the wet flakes when the wet flakes entered the extruder 400. In various embodiments, the low-pressure vacuum removes substantially all (e.g., all) of the water and contaminants from the polymer stream.

In some embodiments, after the molten polymer is run the through the multiple screw section 420, the streams of molten polymer may be recombined and flow into the multiple screw extruder's second single screw section 440. In various embodiments, the resulting single stream of molten polymer may next be run through a filtration system that includes at least one filter. Such a filtration system may include two levels of filtration (e.g., a 40 micron screen filter followed by a 25 micron screen filter). Although, in various embodiments, water and volatile organic impurities are removed during the vacuum process as discussed above, particulate contaminants such as, for example, aluminum particles, sand, dirt, and other contaminants may remain in the polymer melt. Thus, this filtration step may be advantageous in removing particulate contaminates (e.g., particulate contaminates that were not removed in the multiple screw section 420).

In particular embodiments, a viscosity sensor may be used to sense a melt viscosity of the molten polymer stream, for example, following its passage through the filtration system. The system may utilize the viscosity sensor to measure the melt viscosity of a stream, for example, by measuring the stream's pressure drop across a known area. In particular embodiments, in response to measuring an intrinsic viscosity of the stream that is below a predetermined level (e.g., below about 0.8 g/dL), the system may discard the portion of the stream with low intrinsic viscosity and/or lower the pressure in the multiple screw section 420 in order to achieve a higher intrinsic viscosity in the polymer melt. In particular embodiments, decreasing the pressure in the multiple screw section 420 is executed in a substantially automated manner (e.g., automatically) using the viscosity sensor in a computer-controlled feedback control loop with the vacuum pump.

Removing the water and contaminates from the polymer may improve the intrinsic viscosity of the recycled PET polymer by allowing polymer chains in the polymer to reconnect and extend the chain length. In particular embodiments, following its passage through the multiple screw section 420 as operated in conjunction with an attached vacuum pump, recycled polymer melt has an intrinsic viscosity of at least about 0.79 dL/g (e.g., of between about 0.79 dL/g and about 1.00 dL/g). In particular embodiments, passage through a low pressure multiple screw section 420 purifies the recycled polymer melt (e.g., by removing the contaminants and interstitial water). In particular embodiments, the water removed by passing through a lowered pressure environment includes both water from the wash water used to clean the recycled PET bottles as described above, as well as from unreacted water generated by the melting of the PET polymer in, for example, the first single-screw extruder section 410 (e.g., interstitial water). In some embodiments, the majority of water present in the polymer is wash water, but some percentage may be unreacted water.

In particular embodiments, passage through the low pressure multiple screw section 420 purifies the recycled polymer stream (e.g., by removing the contaminants and interstitial water) and makes the recycled polymer substantially structurally similar to (e.g., structurally the same as) pure virgin PET polymer. In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products.

Operation 2: Adding a Colorant to the Polymer Stream Downstream from the Primary Extruder In particular embodiments, after the recycled PET polymer, virgin PET, or PTT has been extruded and purified by the above-described extrusion process, a colorant (e.g., liquid colorant, solid colorant, molten liquid polymeric masterbatch, liquid polymeric masterbatch, solid polymeric masterbatch, compounded coloring material, etc.) may be added to the resultant polymer stream. FIG. 2 shows a polymer stream of PTT 200 passing through a primary extruder 202 before Colorant A 204 and PET 220 are added via a secondary extruder 206. FIG. 2 is equally applicable to implementations in which the polymer stream being processed is PET 220.

The secondary extruder 206 may include any suitable extruder such as for example, any suitable single-screw extruder, multiple screw extruder, or other extruder described herein (e.g., a twin screw extruder, a planetary extruder, or any other suitable extrusion system). In particular embodiments, a suitable secondary extruder 206 may include, for example, an HPE-150 Horizontal Extruder manufactured by David-Standard, LLC of Pawcatuck, Conn. In other particular embodiments, a suitable secondary extruder 206 may include, for example, an MRS extruder.

Colorant A 204 may include a solid colorant, such as pelletized color concentrate, solid polymeric masterbatch, or solid compounded coloring material, which the secondary extruder 206 may be configured to at least partially melt prior to adding Colorant A 204 to the polymer stream. In various other embodiments, Colorant A 204 may comprise other additives such as, for example, a carrier resin which may aid in binding the colorant to the polymer. In other embodiments, Colorant A 204 may include any suitable liquid colorant, such as liquid color concentrate, liquid polymeric masterbatch, or liquid compounded coloring material, which may be pumped into the polymer stream using any suitable pump (e.g., in lieu of using a secondary extruder 206 and a solid colorant).

In various embodiments, the process may further include monitoring an amount of throughput (e.g., polymer output) from the primary extruder 202 in order to determine an appropriate amount of letdown (e.g., an appropriate letdown ratio) such that a proper amount of Colorant A 204 may be added to the polymer stream downstream from the primary extruder 202. In various embodiments, a desirable letdown ratio may include a letdown ratio of between about one tenth of one percent and about eight percent (e.g., about two percent). In other embodiments, the letdown ratio may include any other suitable letdown ratio (e.g., one percent, two percent, three percent, four percent, five percent, six percent, seven percent, etc.). In particular embodiments, the letdown ratio may vary based on a desired color of BCF ultimately produced using the process (e.g., up to about twenty percent).

In various embodiments, adding the colorant 204 downstream of the primary extruder 202 may save on waste during color changeover. For example, when switching between producing BCF of a first color to producing BCF of a second color, it may be necessary to change the colorant 204 added to the polymer stream (e.g., from a first colorant that would result in BCF of the first color to a second colorant that would result in BCF of the second color). As will be understood by one skilled in the art, after switching from adding the first colorant to the polymer stream to adding the second colorant to the polymer stream, residual first colorant may remain in in the system between the point in the process at which the colorant is added and the spinning machine 212. For example, residual first colorant may remain in the secondary extruder 206, the one or more static mixing assemblies 208, or any other physical mechanism used in the process (such as any mechanism shown in FIG. 2) or any piping or tubing which connects the various components of the system.

As will be understood by one skilled in the art, after running the process with the second colorant for a suitable amount of time, the BCF produced by the process will eventually be of the second, desired color (e.g., because the first colorant will eventually be substantially flushed out the system). However, between the point at which there is a changeover in adding the second colorant to the process rather than the first colorant and the point at which the process begins to produce the desired color of BCF, the process may produce some waste BCF that is of an undesired color (e.g., due at least in part to the residual first colorant).

In various embodiments, the waste BCF produced using the process described herein may be considerably lower than waste BCF produced during color changeovers using other processes (e.g., such as other processes in which colorant is added to PET prior to extrusion in a primary extruder such as an MRS extruder). For example, in various embodiment, the process described herein may limit waste BCF to an amount of BCF produced when running a single package of colorant (e.g., of the second colorant), which may, for example, result in less than about 100 pounds of waste. In particular embodiments, reducing waste in this manner may lead to cost saving in the production of BCF.

Operation 3: Adding PET to the Extruded Polymer Stream

According to an embodiment shown in FIG. 2, the polymer stream being processed is a PTT 200 polymer stream. In this example, rather than adding the desired quantity of PET 220 to the primary extruder 202, as conventionally done, the PET 220 may be added to the secondary extruder 206 (e.g., only, without colorant). In another example, rather than adding the desired quantity of PET 220 to the primary extruder 202, the PET 220 may be added to the secondary extruder 206 with the Colorant A 204. These configurations may be especially advantageous when there is other equipment or production line configuration issues that extend the length of the production line to a degree that would create excessive hold up times resulting in undesirable transesterification if the PET 220 were added at the primary extruder 202 rather than downstream at the secondary extruder 206, as shown in FIG. 2. The addition of PET into a stream of PTT will be discussed in further detail with respect to embodiments shown in FIGS. 11 and 12. Structural aspects of a polymer injection port for providing PET 220 into the polymer stream of PTT 200 will be described with respect to FIGS. 15 and 17A-17C.

Figure 5:
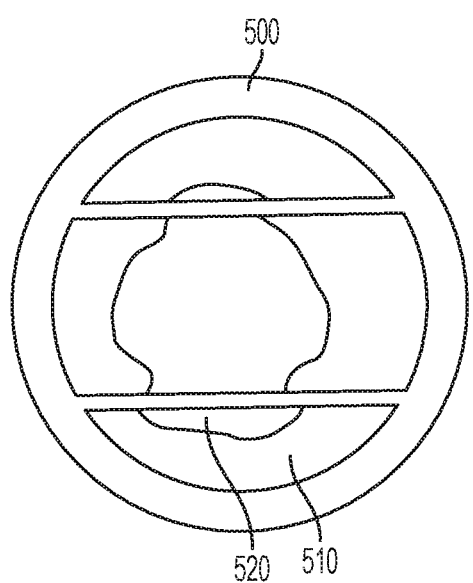
FIG. 5 is a cross-sectional end view of dispersion of a colorant in a stream of molten polymer prior to passing through the one or more static mixing assemblies shown in FIG. 2, according to various embodiments described herein.
Figure 6:
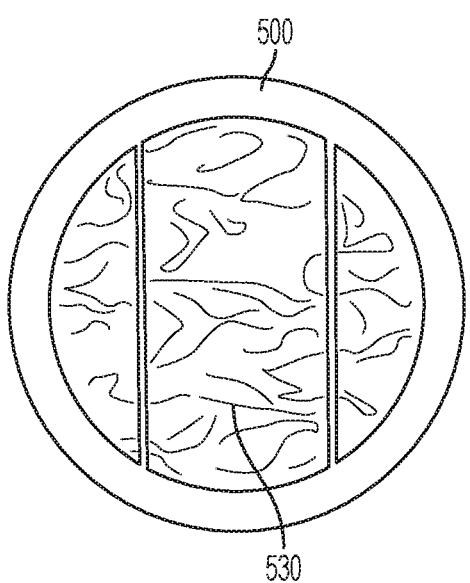
FIG. 6 is a cross-sectional end view of dispersion of a colorant in a stream of molten polymer following passing through the one or more static mixing assemblies shown in FIG. 2, according to various embodiments described herein.

Operation 4: Using One or More Static Mixing Assemblies to Mix Polymer Stream with Added Colorant In particular embodiments, following the addition of the Colorant A 204 to the stream of molten polymer, the process may include the use of one or more static mixing assemblies 208 (e.g., one or more static mixing elements) to mix and disperse the Colorant A 204 throughout the polymer stream. As may be understood by one skilled in the art, due in part to the viscosity of the polymer stream (e.g., polymer stream), when a dye or other colorant is added to the polymer stream, the dye and the stream may not mix. In various embodiments, the flow of the polymer stream is substantially laminar (e.g., laminar) which may, for example, further lead to a lack of mixing. FIG. 5 depicts a cross section view of a polymer stream conduit 500 containing a polymer stream 510 into which a colorant 520 has been added. As shown in this figure, the colorant 520 has not mixed with the polymer stream 510. Generally speaking, the unmixed polymer stream 510 and colorant 520 may not be suitable for forming into BCF (e.g., because the resulting filament may not have a consistent, uniform color). FIG. 6 depicts the polymer stream conduit 500 of FIG. 5 in which the colorant 520 and the polymer stream 510 have been (e.g., uniformly) mixed into a colored polymer stream 530. This substantially uniform mixing, in various embodiments, is achieved through the use of one or more static mixing assemblies, such as the one or more static mixing assemblies 208 shown in FIG. 2. Generally speaking, this uniformly mixed colored polymer stream 530 shown in FIG. 5 may be far more suitable for producing uniformly colored BCF.

Figure 7:
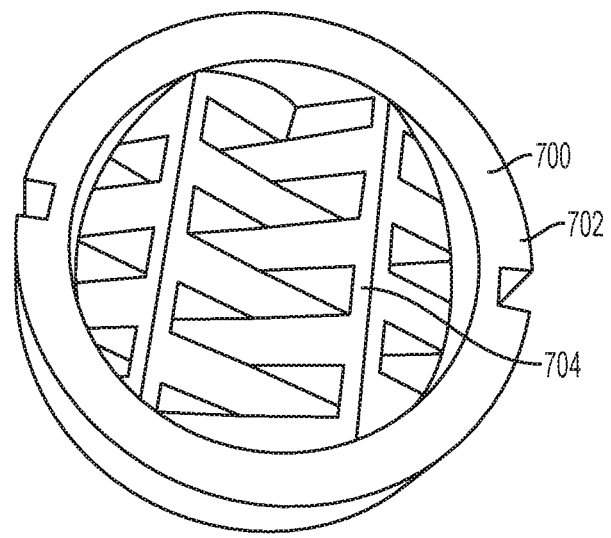
FIG. 7 is a cross-sectional end view of the exemplary one of the one or more static mixing elements of FIG. 2, according to a particular embodiment, according to various embodiments described herein.

FIG. 7 depicts an exemplary static mixing element 700 which may, in various embodiments, be utilized in the achievement of substantially uniform (e.g., uniform) mixing of the polymer stream and the added colorant (e.g., Colorant A 204 from FIG. 2). As may be understood from this figure, a static mixing element 700 may comprise a housing 702 (e.g., a substantially circular or cylindrical housing) and be inserted into a polymer stream conduit or other housing (e.g., incorporated into a polymer stream conduit or other housing). In the embodiment shown in this figure, the static mixing element 700 may include a plurality of mixing bars 704 disposed within the housing 702. In particular embodiments, the static mixing element 700 creates mixing by directing two or more viscous materials to follow the geometric structure of the mixing bars 704 disposed within the housing 702 that continuously divide and recombine the flow. In various embodiments, a very high degree of mixing may be achieved over a short length of static mixing elements. In particular embodiments, the static mixing element 700 may include no moving parts and may be made of any suitable material, such as, for example, high strength heat treated stainless steel, a suitable plastic, or any other suitable material.

Figure 8:
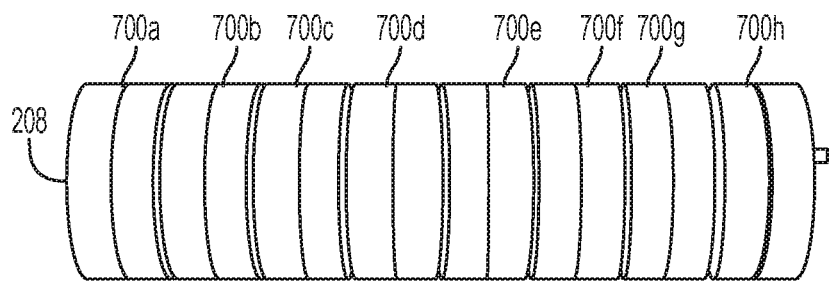
FIG. 8 is a side view of eight of the exemplary static mixing elements of FIG. 7 coupled to one another to form a static mixing assembly, according to various embodiments described herein.

In particular embodiments, the static mixing assemblies 208 shown in FIG. 2 may comprise any suitable static mixing element, such as, for example, a Stamixco GXR 40/50 or GXR 52/60 made by Stamixco LLC of Brooklyn, N.Y. A suitable mixing element for use as, or within, a static mixing assembly is described in U.S. Pat. No. 8,360,630, entitled "Mixing Elements for a Static Mixer and Process for Producing Such a Mixing Element," which is hereby incorporated herein in its entirety. In other embodiments, the one or more static mixing assemblies 208 may comprise any other suitable static mixing element having a suitable arrangement of mixing bars for dispersing the colorant throughout the polymer stream. In particular embodiments, the one or more static mixing assemblies 208 may include a plurality of individual static mixing elements such as individual static mixing elements 700 shown in FIG. 8. FIG. 8 depicts eight static mixing elements 700a-h coupled to one another to form a static mixing assembly 208. In other embodiments, the static mixing assemblies 208 may include any suitable number of individual static mixing elements 700 (e.g., up to 36 or 40 individual static mixing elements). In particular embodiments, the individual static mixing elements 700 may be oriented in any suitable direction relative to one another (e.g., oriented randomly relative to one another when coupled to one another as shown in FIG. 8). In other embodiments, the static mixing elements may be oriented such that they alternate a horizontal and vertical alignment relative to one another. In still other embodiments, each adjacent static mixing element is substantially perpendicular to the adjacent static mixing element. In still other embodiments, the individual static mixing elements may be arranged in any suitable unaligned or aligned manner.

Figure 9:
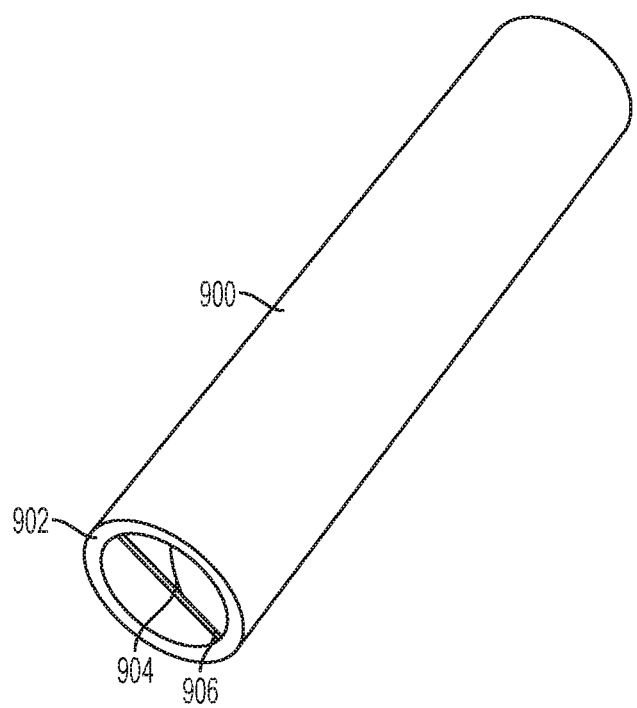
FIG. 9 is a perspective view of an exemplary helical static mixing assembly, according to various embodiments described herein.

In various other embodiments, the static mixing assemblies 208 may include a suitable number of static mixing elements comprising one or more suitable helical mixing elements. FIG. 9 depicts an exemplary helical static mixing assembly 900 that may be configured with a substantially cylindrical (e.g., cylindrical) housing 902 in which at least one helical mixing element 904 may be disposed. As shown in this figure, the at least one helical mixing element 904 may define a leading edge 906 that extends between opposing interior portions of the cylindrical housing 902 (e.g., along a diameter of the cylindrical housing 902). In various embodiments, the leading edge 906 may be substantially planar (e.g., linear) and may have any suitable thickness. As may be understood from this figure, the leading edge 906 may divide (e.g., bisect) a polymer stream flowing into the helical static mixing assembly 900 into two streams (e.g., a first stream on a first side of the leading edge 906 and a second stream on a second side of the leading edge 906). In particular embodiments, the leading edge 906 may divide the flow into substantially equal streams as material passes the helical mixing element 904.

Figure 10:
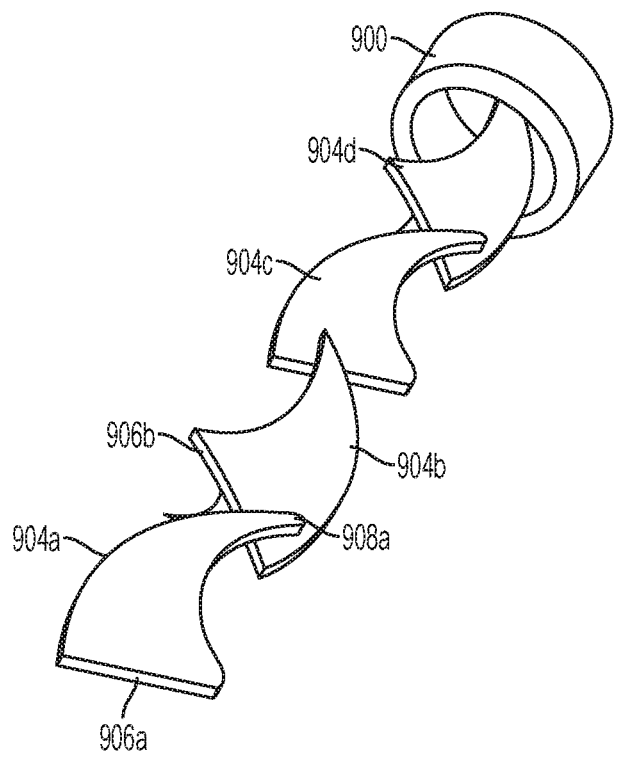
FIG. 10 is a perspective cutaway view of the helical static mixing assembly of FIG. 9 showing four helical static mixing elements, according to various embodiments described herein.

FIG. 10 depicts the helical static mixing assembly 900 of FIG. 9 in a cutaway view that shows the four helical mixing elements 904 that may be disposed within the housing 902. As may be further understood from FIG. 10, each individual helical mixing element 904 (e.g., helical mixing element 904a) may be constructed of a substantially rectangular (e.g., rectangular) plate defining a leading edge 906a and a trailing edge 908a that has been twisted about 180 degrees (e.g., 180 degrees). As shown in this figure, the leading edge 906a and trailing edge 908a of helical mixing element 904a are substantially parallel (e.g., parallel) to one another. Also as shown, the helical mixing element 904a extends between the leading edge 906a and trailing edge 908a in a helical shape. Although shown in this figure as having a twist of 180 degrees between the leading edge 906a and trailing edge 908a, it should be understood that in various other embodiments, the helical mixing element 904a, and each of the individual helical mixing elements 904, may have any other suitable helical shape or portion thereof. For example, in particular embodiments, the one or more of the helical mixing elements 904 may comprise a substantially rectangular plate defining a leading edge 906 and a trailing edge 908 that has been twisted any other suitable amount between zero and 360 degrees (e.g., 45 degrees, 90 degrees, 270 degrees, etc.) In still other embodiments, one or more of the helical mixing elements 904 may have any suitable length relative to its diameter.

As may be further understood from FIG. 10, in various embodiments, each particular helical mixing element 904a-d may be disposed within the housing 902 at an angle to an adjacent helical mixing element 904. For example, helical mixing element 904a may be disposed such that a trailing edge 908a of helical mixing element 904a forms an angle with the leading edge 906b of helical mixing element 906b. In particular embodiments, the trailing edge 908a and leading edge 906b of adjacent helical mixing elements 904 may form any suitable angle with one another. In particular embodiments, the trailing edge 908a and leading edge 906b of adjacent helical mixing elements 904 may form an angle of between about zero degrees and about ninety degrees with one another. In particular embodiments, the trailing edge 908a and leading edge 906b of adjacent helical mixing elements 904 may at least partially abut one another and be substantially co-facing (e.g., co-facing). In particular embodiments, the trailing edge 908a and leading edge 906b of adjacent helical mixing elements 904 may form a particular angle between one another (e.g., zero degrees, ninety degrees, forty-five degrees, or any other suitable angle). A suitable helical static mixing assembly for use in the above-described process may include, for example, a suitable helical static mixing assembly manufactured by JLS International of Charlotte, N.C.

It should be understood that for the purposes of this disclosure, a static mixing assembly 208 may be configured in any desired arrangement that may provide a desired number of one or more individual mixing elements to a polymer stream. For example, a static mixing assembly 208 may include a single mixing element within a single housing with one or more mixing bars 704 and/or one or more helical mixing elements 904 disposed within the housing. Alternatively, the static mixing assembly 208 may include multiple static mixing elements positioned in series within a single housing. According to yet another alternative embodiment, the static mixing assembly 208 may include a plurality of static mixing elements, each having their own respective housing positioned in series adjacent to one another. In this embodiment, the plurality of static mixing elements is collectively considered the static mixing assembly 208. For example, in particular embodiments, the static mixing assembly 208 comprises up to 36 individual static mixing elements (e.g., 36 static mixing elements, 34 static mixing elements, etc.). In still other embodiments, the static mixing assembly 208 may include any other suitable number of static mixing elements sufficient to substantially uniformly (e.g., homogeneously) mix the molten polymer with the added colorant (e.g., to substantially uniformly mix the molten polymer and the added colorant into a colored polymer stream 530 as shown in FIG. 6). This may include, for example, up to 40 static mixing elements, or any other suitable number).

In particular embodiments, the one or more static mixing assemblies 208 may comprise any suitable combination of static mixing elements such as, for example, any suitable break down of the static mixing element 700 shown in FIG. 7 and the helical static mixing assembly 900 and/or helical mixing elements 904 shown in FIGS. 9 and 10. For example, in a particular embodiment, the static mixing assemblies 208 may include 36 helical mixing elements 904. In other embodiments, the static mixing assemblies 208 may include 36 static mixing elements 700 from FIG. 7. In various embodiments, the static mixing assemblies 208 may comprise any suitable number of alternating static mixing elements 700 shown in FIG. 7 and helical mixing elements 904 shown in FIGS. 9 and 10. In various other embodiments, the static mixing assemblies 208 may have up to a total of forty (e.g., 36), or more, individual static mixing elements 700 shown in FIG. 7 and helical mixing elements 904 shown in FIGS. 9 and 10. In such embodiments, the static mixing elements 700 from FIG. 7 and the helical mixing elements 904 may be arranged and combined in any suitable order and manner (e.g., a specific order, a random order, a pattern such as a repeating pattern, etc.).

Creating a Tonal Color in Polymer Stream

According to various embodiments, it may be desirable to create BCF for use in the production of carpet and other products that is not uniform in color. Specifically, it may be desirable to create BCF that has a tonal color effect. For the purposes of this disclosure, BCF having a tonal color effect may include BCF having any color that is not uniform, such as BCF that includes different shades of the same color (e.g., with gradual changes between one shade to another). Conventionally, tonal color effects may be created using one or more yarns or filaments having one dark end and one light end, which are twisted together to create a tonal yarn. However, using the concepts and technologies described herein, a tonal color effect may be created using a single yarn, without utilizing a conventional twisting process.

According to various embodiments, a tonal effect characteristic of the polymer stream and resulting BCF product may be created using a smaller number of static mixing elements (e.g., individual static mixing elements 700, helical mixing elements 904) as compared to the at least 30 individual static mixing elements utilized to create the uniformly mixed and uniformly colored polymer streams described elsewhere herein. For example, in some embodiments, a smaller number of individual static mixing elements 700 or helical static mixing elements 904 (e.g., any discrete number less than 30) may be used to create the static mixing assemblies 208 of FIG. 2. By using a relatively small number of individual static mixing elements, in various embodiments, the colorant injected into the laminar flow of the polymer stream traversing through the static mixing assemblies 208 may not be uniformly mixed into the polymer stream prior to being received by the spinning machine 212.

While, in various embodiments, providing a static mixing assembly 208 with fewer individual static mixing elements (e.g., static mixing elements 700, helical static mixing elements 904) may create a tonal color characteristic in the resulting polymer stream, various embodiments described herein may produce tonal color effects, while allowing for the same BCF manufacturing system to be utilized to create both uniformly-colored BCF and BCF having tonal color effects with, in various embodiments, minimal time and effort in changing the system set up between manufacturing runs of the two products.

Figure 13:
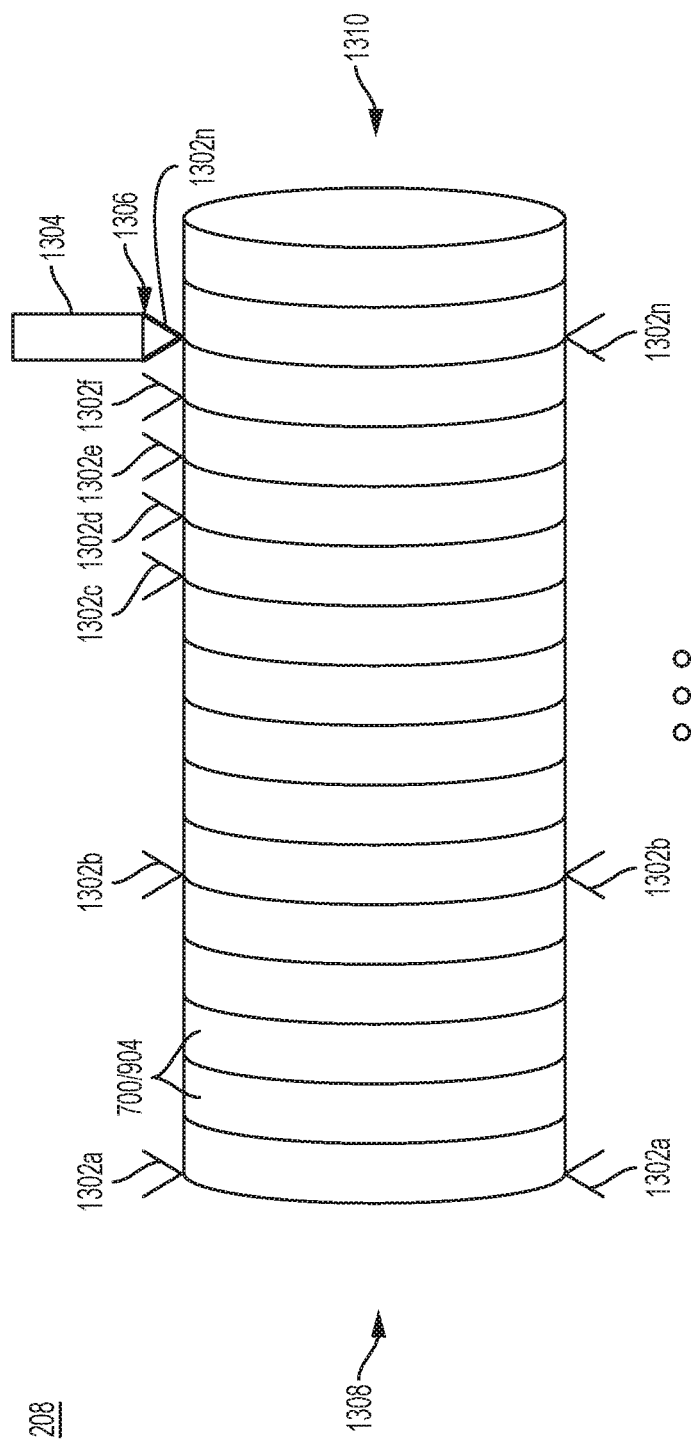
FIG. 13 depicts a side view of a static mixing assembly having individual static mixing elements coupled to one another to form a static mixing assembly and one or more color injection assemblies coupled to the static mixing assembly, according to various embodiments described herein.

Turning to FIG. 13, an exemplary static mixing assembly 208 is shown having a number of individual static mixing elements 700 or 904 coupled together to create a length of the static mixing assembly 208 through which the polymer stream flows and mixes. It should be appreciated that for clarity purposes, the static mixing assembly 208 is shown with a reduced quantity of individual static mixing elements 700 or 904 shown in FIG. 13. As disclosed herein, the static mixing assembly 208 of various embodiments may have more than 30 (e.g., 36, 40) individual static mixing elements 700 or 904.

According to various embodiments, the static mixing assembly 208 may have one or more color injection assemblies 1302*a-n* (collectively referred to as color injection assemblies 1302 or color injection ports 1302), and/or liquid injection nozzles, positioned along a length of the static mixing assembly 208. The one or more color injection assemblies 1302 may include any type of port suitable for facilitating the injection of colorant from one or more color probes 1304 into the polymer stream within the static mixing assembly 208. According to one embodiment, the one or more color injection assemblies 1302 include threads for receiving the one or more color probes 1304 and/or one or more mechanisms coupled to the one or more color probes 1304. In other embodiments, the one or more color injection assemblies 1302 and the one or more color probes 1304 may be coupled together via a quick disconnect connection 1306 that allows for easy and rapid connection of the one or more color probes 1304 to/from the color injection assemblies 1302. Various features of color injection assemblies 1302 according to various embodiments will be described in detail below with respect to FIGS. 15 and 16A-16C.

Once a color probe 1304 is connected to a respective color injection assembly 1302, colorant may be injected from the probe, through the port and into a location that is substantially at a centered position of the polymer stream within the static mixing assembly 208, a location proximate to an inside wall of the housing of the static mixing assembly 208 (e.g., housing 702), and/or any other suitable location. Injecting colorant into the center of the polymer stream may result in more uniform mixing, while injecting the colorant into the polymer stream proximate to a wall of the static mixing assembly's 208 housing 702 may yield more distinct tonal color effects in the resulting colored polymer stream and corresponding BCF product.

FIG. 13 shows three pairs of color injection assemblies 1302*a*, 1302*b*, 1302*n* positioned in three different locations along the length of the static mixing assembly 208 and four individual color injection assemblies 1302*c*, 1302*d*, 1302*e*, 1302*f*. It should be appreciated that any number of color injection assemblies 1302 may be used at each respective distance along the length of the static mixing assembly 208 and that groups of one or more color injection assemblies 1302 may be positioned at any respective distance along the length of the static mixing assembly 208 without departing from the scope of this disclosure. In particular embodiments, one or more color injection ports are positioned between each of at least 2, 3, 4, 5, 6, 7, or 8 consecutive respective adjacent pairs of mixing elements within the mixing assembly.

For example, while the one or more of the color injection assemblies 1302 are shown in pairs at some locations (pairs of color injection assemblies 1302*a*, 1302*b*, 1302*n*), various embodiments may utilize only a single color injection assembly 1302 at each location, or may alternatively utilize more than two color injection assemblies 1302 at each location along the length of the static mixing assembly 208. In various embodiments, the positioning of the one or more color injection assemblies 1302 around the circumference of the static mixing assembly 208 may differ. For example, a first color injection assembly 1302*a* may be positioned on a top side (i.e., at the zero degree location when viewing the circular cross-section) of the static mixing assembly 208, while a second color injection assembly 1302*b* that is located downstream along the length of the static mixing assembly 208 may be positioned on the right side (i.e., at the 90 degree location when viewing the circular cross-section) of the static mixing assembly 208. The various radial positionings of color injection ports/assemblies 1302 around the circumference of the static mixing assembly 208 may yield different tonal color effects in the colored polymer stream exiting the static mixing assembly 208 if the colorant is injected within the polymer stream at a location other than centrally (e.g., proximate to the wall of the housing of the static mixing assembly 208).

The static mixing assembly 208 shown in FIG. 13 has one or more color injection assemblies 1302 positioned at the upstream end 1308 of the static mixing assembly 208 where the polymer stream may enter. As described above, providing colorant at the upstream end 1308 may result in a uniform mix and corresponding uniformly colored polymer stream exiting the downstream end 1310 of the static mixing assembly 208. However, if colorant is added at locations downstream of the upstream end 1308, less mixing of the colorant with the polymer stream may occur, resulting in a tonal color effect. As discussed, colorant added at the one or more color injection assemblies 1302*n* positioned within 5 to 20 individual static mixing elements from the downstream end 1310 of the static mixing assembly 208, the resulting colored polymer stream is most likely to possess distinct tonal color effects that may be formed into a tonal yarn using one or more spinning machines 212.

In various embodiments, multiple color probes 1304 (e.g., that may be configured to selectively deliver liquid colorant under pressure—e.g., via a suitable pump arrangement, such as any suitable pump arrangement described below) may be utilized simultaneously with multiple corresponding color injection assemblies 1302 at different locations along the length of the static mixing assembly 208 to create tonal color effects with multiple colors. For example, a first color probe 1304 having a first color may be coupled to the color injection assembly 1302*b*, while a second color probe 1304 having a second color may be coupled to the color injection assembly 1302*n*. The resulting colored polymer stream may contain tonal color effects with respect to the first color that are more subtle than the tonal color effects associated with the second color that are present in the same colored polymer stream. This may occur because the polymer stream is injected with the first color (e.g., by color injection assembly 1302*b*) for a longer period of time than the colored polymer stream (containing a mix with the first color) is injected with the second color (e.g., by color injection assembly 1302*n*).

Alternatively, according to another embodiment, a first color probe 1304 having a first color may be coupled to the color injection assembly 1302*n* shown on the top side of the static mixing assembly 208, while a second color probe 1304 having a second color may be coupled to the color injection assembly 1302*n* shown on the bottom side of the static mixing assembly 208. In this embodiment, two different colorants are injected into the polymer stream at different radial locations around the circumference of the static mixing assembly 208. Doing so may allow the polymer stream, the first colorant, and the second colorant to mix for a short length prior to exiting the downstream end 1310 of the static mixing assembly 208 with a unique tonal color effect.

Figure 14:
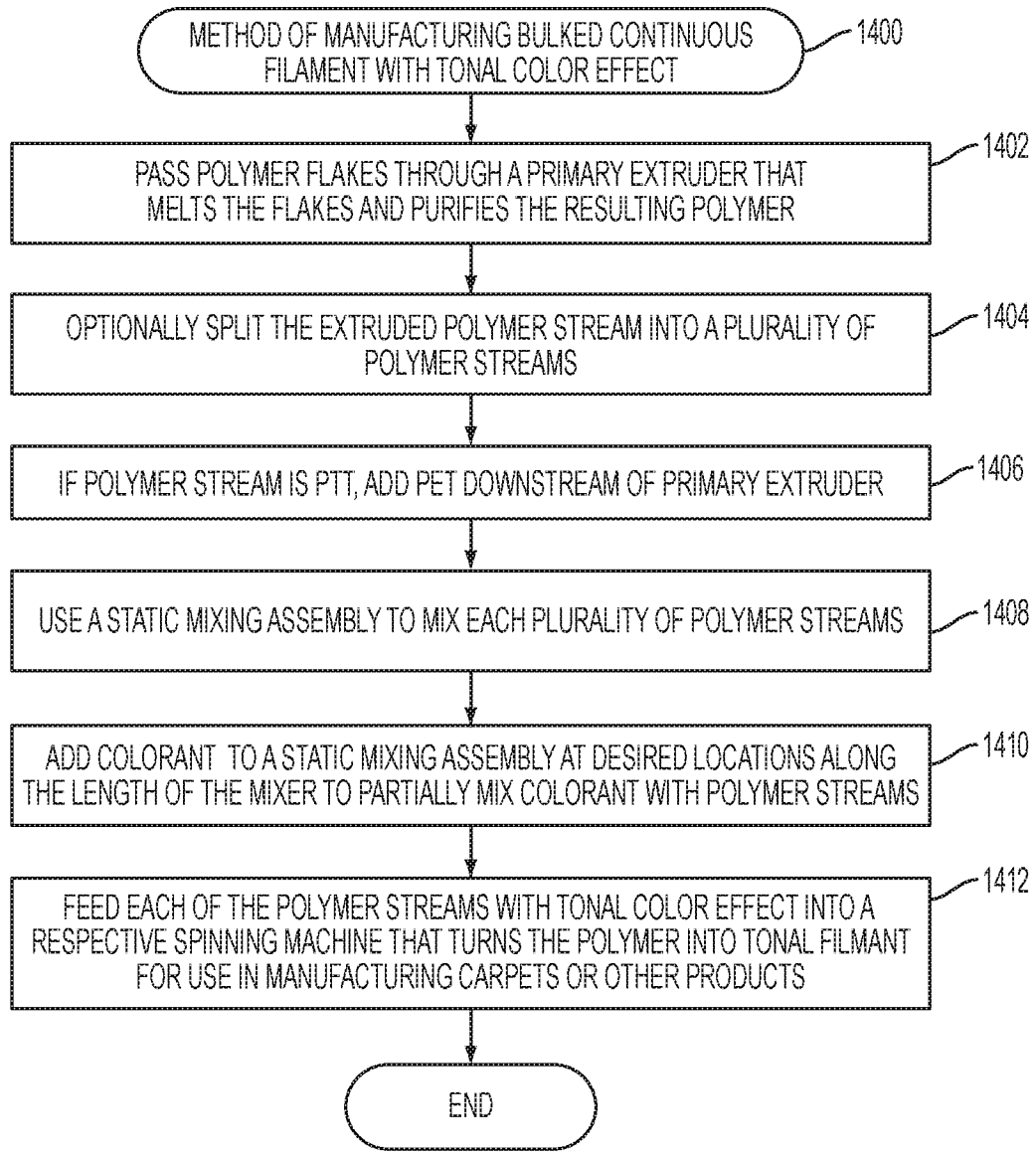
FIG. 14 depicts a high-level overview of a manufacturing process for producing and coloring a bulked continuous filament with a tonal color effect, according to various embodiments described herein.

FIG. 14 depicts a high-level overview of BCF manufacturing process 1400 for producing and coloring BCF with a tonal color effect, for example, for use in the production of carpet and other products. The process 1400 may begin as described above with respect to operations 102 and 104 of FIG. 1 above. Specifically, at operation 1402, PET, PTT, or other polymer flakes are passed through an extruder that melts the flakes and purifies the resulting polymer. At operation 1404, the extruded polymer stream may then be optionally split into a plurality of polymer streams.

At operation 1406, PET 220 may be added to the polymer stream downstream of the primary extruder 202 if the polymer stream is PTT 200. One or more static mixing assemblies 208 may be used to mix each of the polymer streams at operation 1408. Colorant (e.g., liquid colorant, solid colorant, molten liquid polymeric masterbatch, liquid polymeric masterbatch, solid polymeric masterbatch, compounded coloring material, etc.) may be added at operation 1410 to the one or more static mixing assemblies 208 through one or more color injection assemblies 1302. The one or more color injection assemblies 1302 that are used for injecting colorant may be selected based on the location of the one or more color injection assemblies 1302 along the length of the one or more static mixing assemblies 208. The locations of the one or more color injection assemblies 1302 may determine the amount of mixing of the one or more colorants with the polymer stream within the static mixing assembly 208 and/or the desired tonal color effect of the resulting BCF product. At operation 1412, each of the polymer streams with the desired tonal color effects are fed into a respective spinning machine 212 to turn the polymer into a tonal filament for use in manufacturing carpets or other products.

Figure 15:
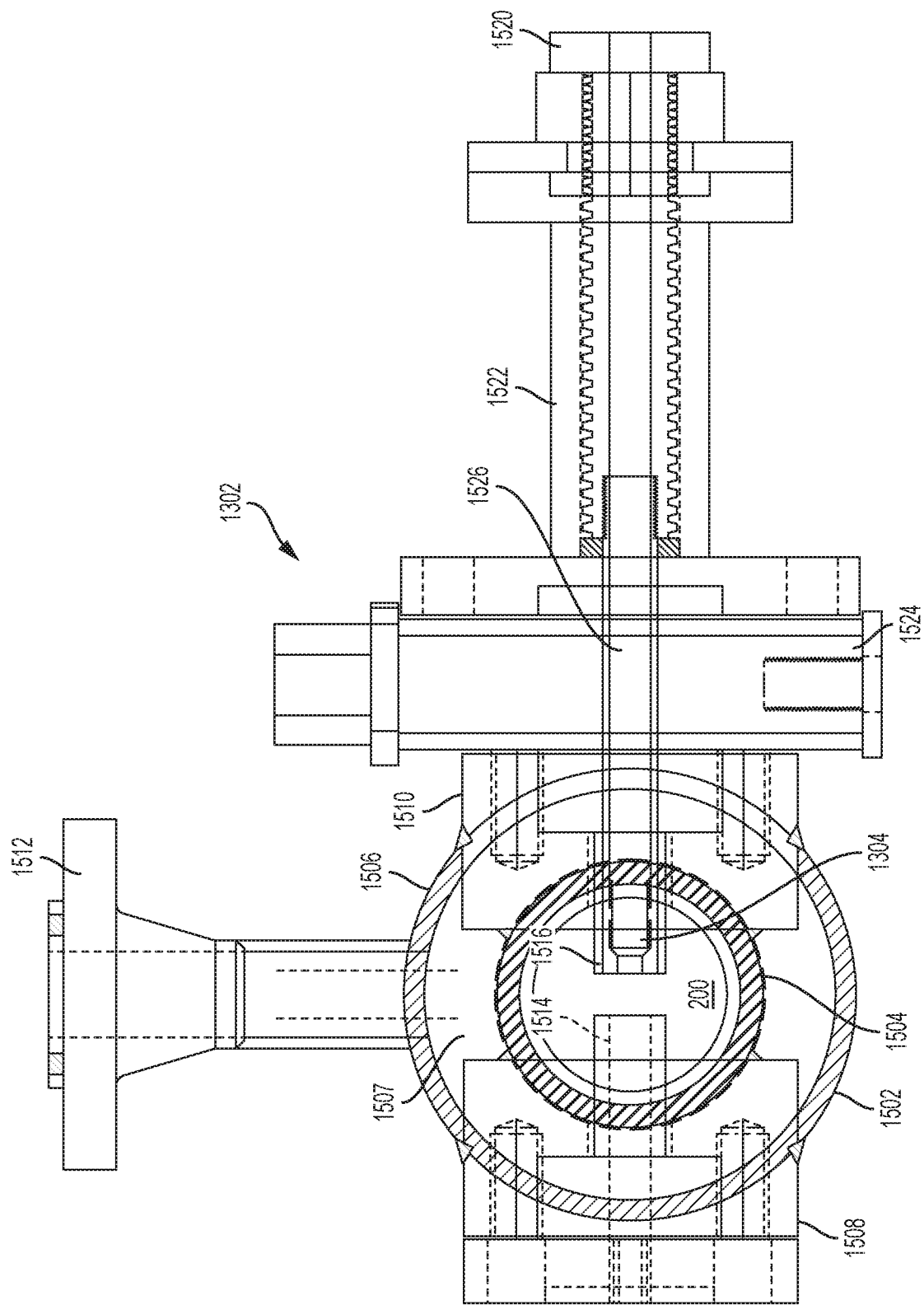
FIG. 15 depicts a cross-sectional view of a polymer stream conduit with a color injection port and a polymer injection port for providing liquid colorant and PET, respectively, to a polymer stream, according to various embodiments described herein.

Turning now to FIG. 15, an illustrative example of a color injection assembly 1302 will be described. FIG. 15 shows a cross-sectional view of a polymer stream conduit 1502 with a color injection port 1510 and a polymer injection port 1508 for providing liquid colorant and PET 220, respectively, to a polymer stream of PTT 200 (e.g., or for providing liquid colorant to a polymer stream of PET or other suitable polymer or combination of polymers). According to this example, the polymer stream conduit 1502 includes both an inner and outer shell. The polymer stream of PTT 200 may flow through the inner shell of polymer stream conduit 1504 (e.g., away from the viewer, into the page). A heat transfer liquid 1507 may flow between the inner shell 1504 and the outer shell of the polymer stream conduit 1502. In a particular embodiment, a suitable heat transfer liquid 1507 that may be used is DOWTHERM "A" from The Dow Chemical Company of Midland, Mich. The heat transfer liquid 1507 may be controlled to keep the PTT 200 within the inner shell 1502 at a determined or desired temperature. In particular embodiments, the PTT 200 flows at approximately 260° C. at a pressure of approximately between about 1000 psi and about 1200 psi.

In particular embodiments, a flange 1512 (e.g., which may be downstream from a pump) or other suitable mechanism may control a flow of heat transfer liquid 1507 between the inner shell 1504 and the outer shell 1502. The polymer injection port 1508 may include a polymer inlet tube 1514 that extends into the interior portion of the polymer stream to deliver the PET 220 into the PTT 200. The polymer injection port 1508 will be described in greater detail below with respect to FIGS. 17A-17B.

The right portion of FIG. 15 illustrates an example color injection assembly 1302 configured to engage a color injection probe 1304 containing the liquid colorant and to position the color probe 1304 within the polymer stream. From this position within the interior portion of the polymer stream, the liquid colorant is released from the outlet end of a stream engagement portion 1516 of the color injection probe 1304 and into the polymer stream. According to one embodiment, the liquid colorant is introduced to the polymer stream at a centered position of the polymer stream that is substantially equidistant from all walls of the inner shell of the polymer stream conduit 1504.

By injecting the liquid colorant into the center of the polymer stream, the efficiency of the mixing within the downstream static mixing assembly is maximized. As stated above, the static mixing assembly 208 of various embodiments may have more than 30 (e.g., 36, 40) individual static mixing elements 700, 904. Consequently, due to this relatively large number of individual static mixing elements 700, 904, as well as the orientation of the elements, one would expect a similar and consistent mixing quality of the colorant with the polymer stream regardless of the position within the polymer stream in which the liquid colorant is injected upstream of the static mixing assembly 208. However, tests have shown an unexpected result that the most uniform and consistent mixing quality occurs when the liquid colorant is injected in a centered position within the polymer stream that is substantially equidistant from the walls of the inner shell of the polymer stream conduit 1504. To achieve injection at this centered location, the stream engagement portion 1516 of the color injection assembly 1302 extends into the interior portion of the polymer stream to a position adjacent to the centered position of the polymer stream so that the pressurized colorant exiting the color injection probe 1304 flows into the pressurized polymer stream at substantially the centered position of the polymer stream conduit 1502.

Similarly, in particular embodiments, the PET 220 may be injected into the centered position of the polymer stream that is substantially equidistant from all walls of the inner shell of the polymer stream conduit 1504. In the example shown in FIG. 15, the PET 220 is injected at substantially a same position along a length of a polymer stream conduit encompassing the polymer stream. As seen in this example, the polymer inlet tube 1514 of the polymer injection port 1508 and the stream engagement portion 1516 of the color injection assembly 1302 are configured on opposing sides of the polymer stream conduit 1502. By injecting the liquid colorant and the PET 220 into the center of the polymer stream at the same location prior to or at the static mixing assembly 208, a relatively short hold up time prevents transesterification of the PET 220 and PTT 200 mixture, while maximizing the efficiency of the color mixing through the static mixing assembly 208.

According to various embodiments, the color injection assembly 1302 may include a color injector housing 1510 that couples the color injection assembly 1302 to the polymer stream conduit 1502. The color injector housing 1510 may at least partially encompass a color probe channel 1526 extending through the color injection assembly 1302. The color probe channel 1526 engages the color injection probe 1304 and provides a route for the corresponding liquid colorant out of the color injection probe 1304 and into the polymer stream. The color probe channel 1526 extends from the stream engaging portion 1516, through a pressure blocking mechanism 1524, and through a plunger guide 1522 and corresponding plunger 1520. The plunger 1520 engages the color probe 1304 via threads or other fastening mechanism. The plunger guide 1522 is configured to guide the plunger 1520 and corresponding color injection probe 1304 through the color injection assembly 1302 to the stream engaging portion 1516 for delivery of the liquid colorant to the polymer stream.

It is noted that, when color injection is not desired, the color injection probe 1304 may be removed from the color injection assembly 1302. However, by simply removing the color injection probe 1304 from the color injection assembly 1302 without taking further actions, the color probe channel 1526 remains vacant creating an opening into which the PTT 200 may flow rather than remaining in the polymer stream conduit 1502. This may result in hindered flow of PTT 200, clogging of the color probe channel 1526 (which may require maintenance to address), and wasted PTT 200. To prevent this, a color probe channel plug may be inserted into the color probe channel 1526. The color probe channel plug may have an exterior shape that is substantially the same shape and size as the color injection probe 1304. In various embodiments, the color probe channel plug may have a substantially solid exterior and the exterior may comprise any suitable material to help to create a seal between the plug and the color probe channel 1526 to prevent PTT 200 from flowing into the color probe channel 1526 while the plug is operably disposed within the color probe channel 1526.

Figure 16A:
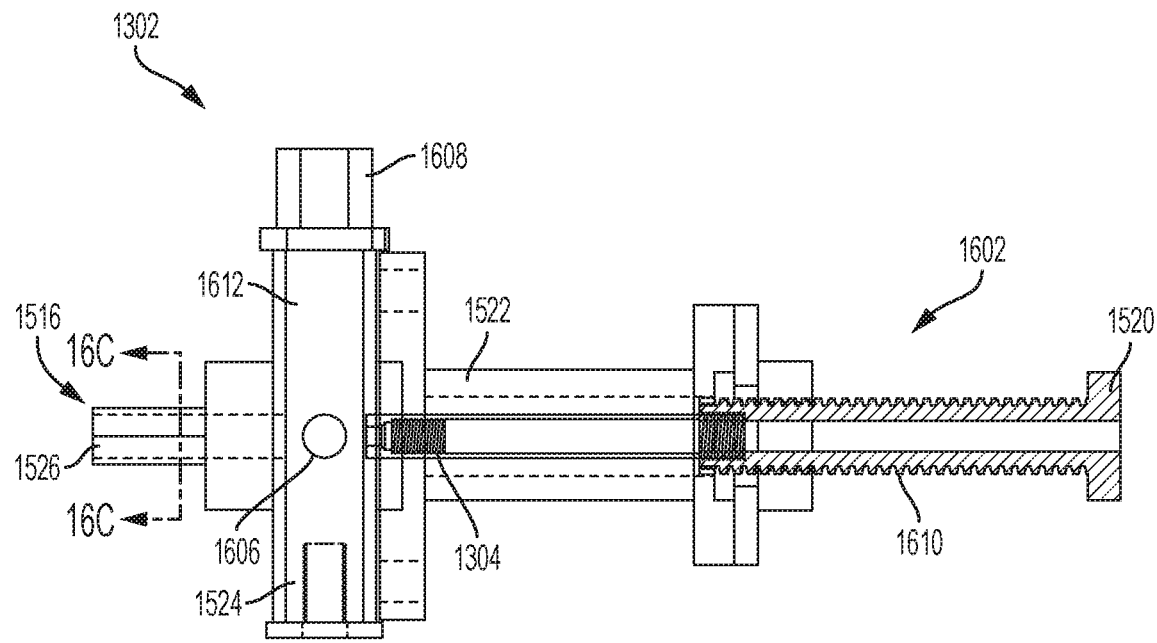
FIG. 16A depicts a side view of a color injection port in a closed configuration with the color probe in a retracted position, according to various embodiments described herein.
Figure 16B:
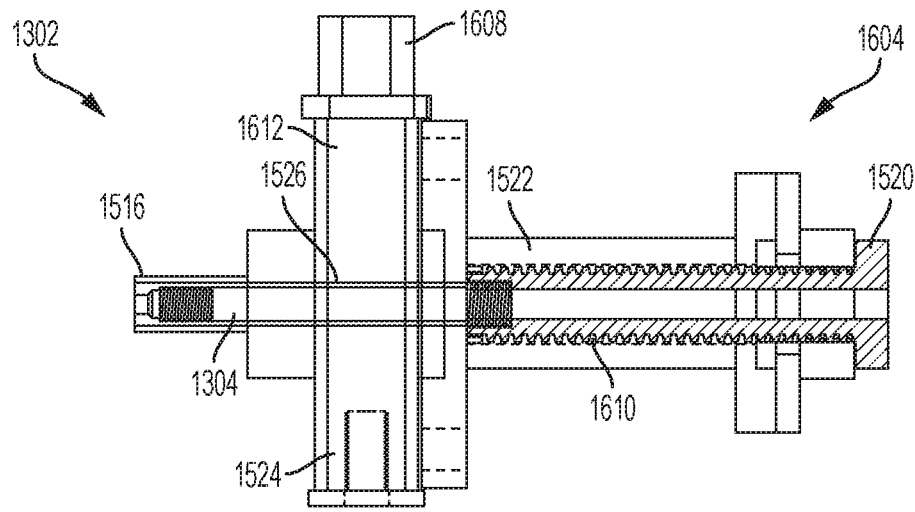
FIG. 16B depicts a side view of a color injection port in an open configuration with the color probe in a deployed position, according to various embodiments described herein.

FIG. 16A shows a side view of the color injection assembly 1302 in a closed configuration 1602 with the color injection probe 1304 in a retracted position, according to particular embodiments. FIG. 16B shows the same view of the color injection assembly 1302 in an open configuration 1604 with the color injection probe 1304 in a deployed position. In the closed configuration 1602, the color injection assembly 1302 is fluidly decoupled from the polymer stream to prevent the polymer stream at the polymer stream pressure from entering the color injection assembly 1302.

The pressure blocking mechanism 1524 activates and deactivates to fluidly couple and decouple the color probe channel 1526 of the color injection assembly 1302 to the polymer stream. When fluidly coupled to the polymer stream, the color injection assembly 1302 may provide liquid colorant from the color injection probe 1304 into the polymer stream via the color probe channel 1526. When fluidly decoupled from the polymer stream, the color injection assembly 1302 is prevented from providing liquid colorant from the color injection probe 1304 to the polymer stream since the color probe channel 1526 is fluidly disconnected, or blocked, from the polymer stream.

To effectuate this selective coupling and decoupling, the pressure blocking mechanism 1524 may utilize any suitable method for providing a barrier between the polymer stream pressure within the polymer stream conduit 1502 and the pressure on the side of the pressure blocking mechanism 1524 opposite the polymer stream conduit 1502. For example, the pressure blocking mechanism 1524 may utilize a gate, pressure door, or a plug that closes over the color probe channel 1526 or otherwise fills the color probe channel 1526 when the color probe 1304 is retracted in order to prevent the polymer stream at the polymer stream pressure from entering the plunger guide 1522.

According to various embodiments, the pressure blocking mechanism 1524 is configured as a cylindrical pressure barrier 1612 that includes a color probe passage 1606. The color probe passage 1606 is substantially similar to the color probe channel 1526 of the color injection assembly 1302 so that when the color probe passage 1606 is aligned with the color probe channel 1526, the color injection probe 1304 may be retracted and deployed through the cylindrical pressure barrier 1612 along the length of the color injection assembly 1302 to transition between closed and open configurations 1602 and 1604, respectively.

FIG. 16A shows the color injection assembly 1302 in a closed configuration 1602 with the color probe 1304 in a retracted position. FIG. 16B shows the color injection assembly 1302 in an open configuration 1604 with the plunger 1520 with corresponding color probe 1304 in a deployed configuration. The cylindrical pressure barrier 1612 is rotatable between open and closed positions. A rotation mechanism 1608 is used to rotate the cylindrical pressure barrier 1612. The rotation mechanism 1608 may include a hex nut or other projection or recession that has features that may be engaged by a corresponding tool to mechanically apply torque turn the rotation mechanism 1608 and connected cylindrical pressure barrier 1612. The rotation mechanism 1608 may be manually operated or may be connected to a controller (not shown) that provides control signals to activate or deactivate the rotation mechanism 1608 in response to a feedback loop that provides a color probe replacement instruction due to a low quantity of liquid colorant within the color probe 1304.

In a closed position, as shown in FIG. 16A, the cylindrical pressure barrier 1612 may be rotated so that the color probe passage 1606 is not aligned with the color probe channel 1526 and the outer wall of the cylindrical pressure barrier 1612 creates a pressure barrier that blocks the color probe channel 1526 to prevent the polymer stream at the polymer stream pressure from entering the color injection assembly 1302 beyond the cylindrical pressure barrier 1612. In an open position, as shown in FIG. 16B, the cylindrical pressure barrier 1612 may be rotated so that the color probe passage 1606 aligns with the color probe channel 1526 of the color injection assembly 1302. The color probe 1304 can be seen extending through the color probe passage 1606 of the cylindrical pressure barrier 1612 when the color injection assembly 1302 is in the open configuration 1604.

The color injection probe 1304 may be engaged with the plunger 1520. The color injection probe 1304 may be threaded into the plunger 1520 or secured in the plunger 1520 using any suitable fastening mechanism. The plunger 1520 with the color injection probe 1304 secured within may be moved toward and away from the cylindrical pressure barrier 1612 within the probe guide 1522, in and out of the color probe channel 1526. This movement may be effectuated using a translation mechanism 1610. The translation mechanism 1610 may include threads so that the plunger 1520 and color injection probe 1304 are screwed into and out of the plunger guide 1522. Alternatively, or additionally, the translation mechanism 1610 may include any hydraulic, pneumatic, electro-mechanical, or mechanical mechanisms that may be configured to slide or screw the plunger 1520 and color injection probe 1304 into and out of the plunger guide 1522. The translation mechanism 1610 may be manually operated or may be connected to a controller (as described above with respect to the rotation mechanism 1608) that provides control signals to activate or deactivate the translation mechanism 1610 in response to a feedback loop that provides a color injection probe replacement instruction due to a low quantity of liquid colorant within the color injection probe 1304.

Figure 16C:
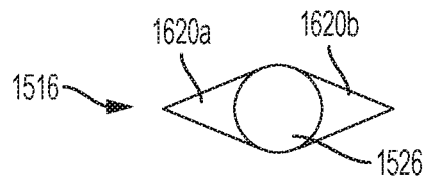
FIG. 16C depicts a cross-sectional view of a stream engaging portion of a color injection port, illustrating leading and trailing edge flow control devices, according to various embodiments described herein.

According to various embodiments, the stream engagement portion 1516 of the color injection assembly 1302 that extends into the polymer stream has features that are configured to maintain, or minimally disrupt, the laminar flow of the polymer stream as it passes. Preventing or minimizing the disruption to the laminar flow of the polymer stream may help ensure an accurate delivery of liquid colorant to the centered position of the polymer stream for efficient, uniform mixing through the downstream static mixing assembly 208. FIG. 16C is a cross-sectional view of the stream engaging portion 1516 of the color injection assembly 1302 taken along the lines 16C shown in FIG. 16A. Specifically, a leading edge flow control device 1620a may be attached to a leading edge of the stream engaging portion 1516 of the color injection assembly 1302, and a trailing edge flow control device 1620b may be attached to a leading edge of the stream engaging portion 1516 of the color injection assembly 1302. Collectively, the leading edge flow control device 1620a and the trailing edge flow control device 1620b are referred to as flow control devices 1620. The flow control devices 1620 may be wedge shaped or may have any desirable airfoil cross-sectional shape that provides for the desired flow characteristics around the stream engaging portion 1516 of the color injection assembly 1302.

As noted above, when color injection is not desired, the color injection probe 1304 may be removed from the color injection assembly 1302. While this may initially be addressed by the pressure blocking mechanism 1524 acting to fluidly decouple the color injection assembly 1302, preventing the color injection probe 1304 from providing liquid colorant from the color injection probe 1304 to the polymer stream, this decoupling leaves the color probe channel 1526 vacant, creating an opening into which the polymer stream may flow rather than remaining in the polymer stream conduit. To prevent the resulting hindered flow of polymer stream, clogging of the color probe channel 1526 (which may require maintenance to address), and wasted polymer, in various embodiments a color probe channel plug may be inserted into the color probe channel 1526.

As noted above, in various embodiments, the color probe channel plug may have substantially the same exterior shape and size as the color injection probe 1304 but may be solid or otherwise closed where the color injection probe 1304 may have an opening configured to provide colorant to the polymer stream. Alternatively, the color probe channel plug may otherwise be configured to facilitate the flow of polymer into the color probe channel 1526. In particular embodiments, the color probe channel plug may be substantially structurally identical to the color injection probe 1304, except that the color probe channel plug may have no opening corresponding to the opening of the color injection probe 1304 through which colorant is designed to flow.

In particular embodiments, the color injection probe 1304 may be removed when the color injection assembly 1302 is in a closed configuration 1602 with the color probe 1304 in a retracted position. Next, the color probe channel plug may be installed in the place of the color injection probe 1304 while the color injection assembly 1302 is in a closed configuration 1602. Then, the color injection assembly 1302 may be put into an open configuration 1604 with the color probe channel plug in a deployed configuration, replacing the color injection probe 1304 and filling the color probe channel 1526, thereby facilitating improved flow of the polymer stream.

In particular embodiments, a color injection probe 1304 and/or a color probe channel plug may have a substantially circular cross-section having a diameter of between about one inch and about three inches (e.g., about three inches). The color probe channel 1526 may define a substantially cylindrical interior space having a substantially circular interior cross-section with a diameter of between about one inch and about three inches (e.g., about three inches). Also, the color injection probe 1304 and/or the color probe channel plug may have a length of between about one inch and about five inches (e.g., between about three inches and about five inches) and the corresponding interior space defined by the color probe channel 1526 may have a corresponding length of between about one inch and about five inches (e.g., between about three inches and about five inches).

In various embodiments, an exterior portion of the probe channel plug is dimensioned to substantially conform to an interior portion of the color probe channel 1526 and to thereby at least substantially create a seal (e.g., create a seal) that inhibits the flow of polymer into the color probe channel 1526. Per the discussion above, in particular embodiments, an exterior shape of the probe channel plug is substantially the same as a corresponding shape of the color probe.

Figure 17A:
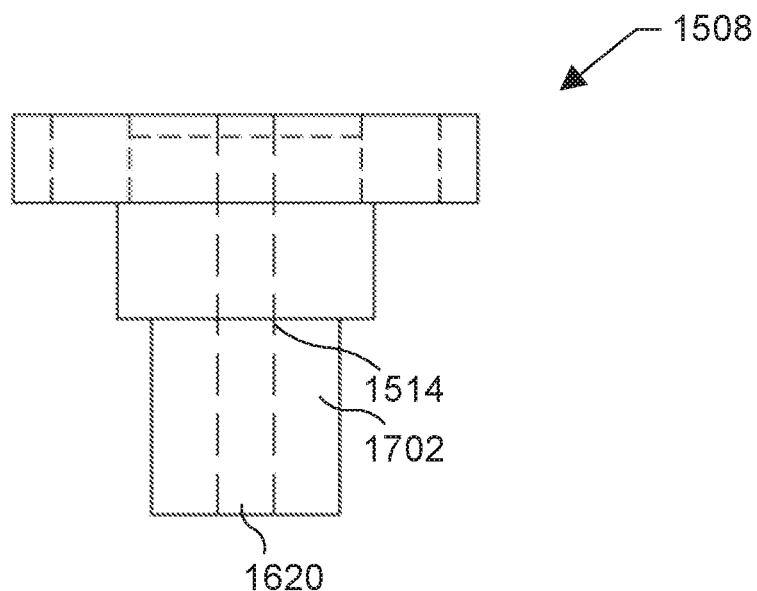
FIGS. 17A-17B depict front, side, and top views, respectively, of a PET injection port, according to various embodiments described herein.
Figure 17B:
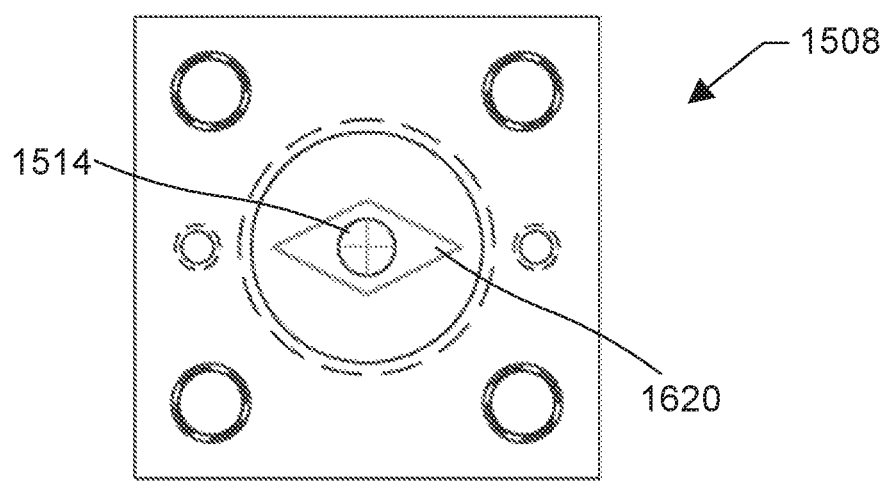

Turning now to FIGS. 17A-17C, front, side, and top views, respectively, of a polymer injection port 1508 for providing PET 220 to a polymer stream of PTT 200 will be discussed. According to various embodiments, the polymer injection port 1508 may include a stream engaging end 1702 encompassing a polymer inlet tube 1514. The stream engaging end 1702 with the polymer inlet tube 1514 extends into the interior portion of the polymer stream to deliver PET 220 into the PTT 200. A gear pump, or other type of pump, may be operatively connected to a source of PET 220 and the polymer injection port 1508 and may be activated to deliver the PET 220 into the polymer stream. The polymer injection port 1508 may include cooling coils that may be used to freeze the PET 220 to stop the flow and then heat it up to re-start the flow, should it be necessary to stop the polymer flow for an equipment change or for any other reason.

Figure 18:
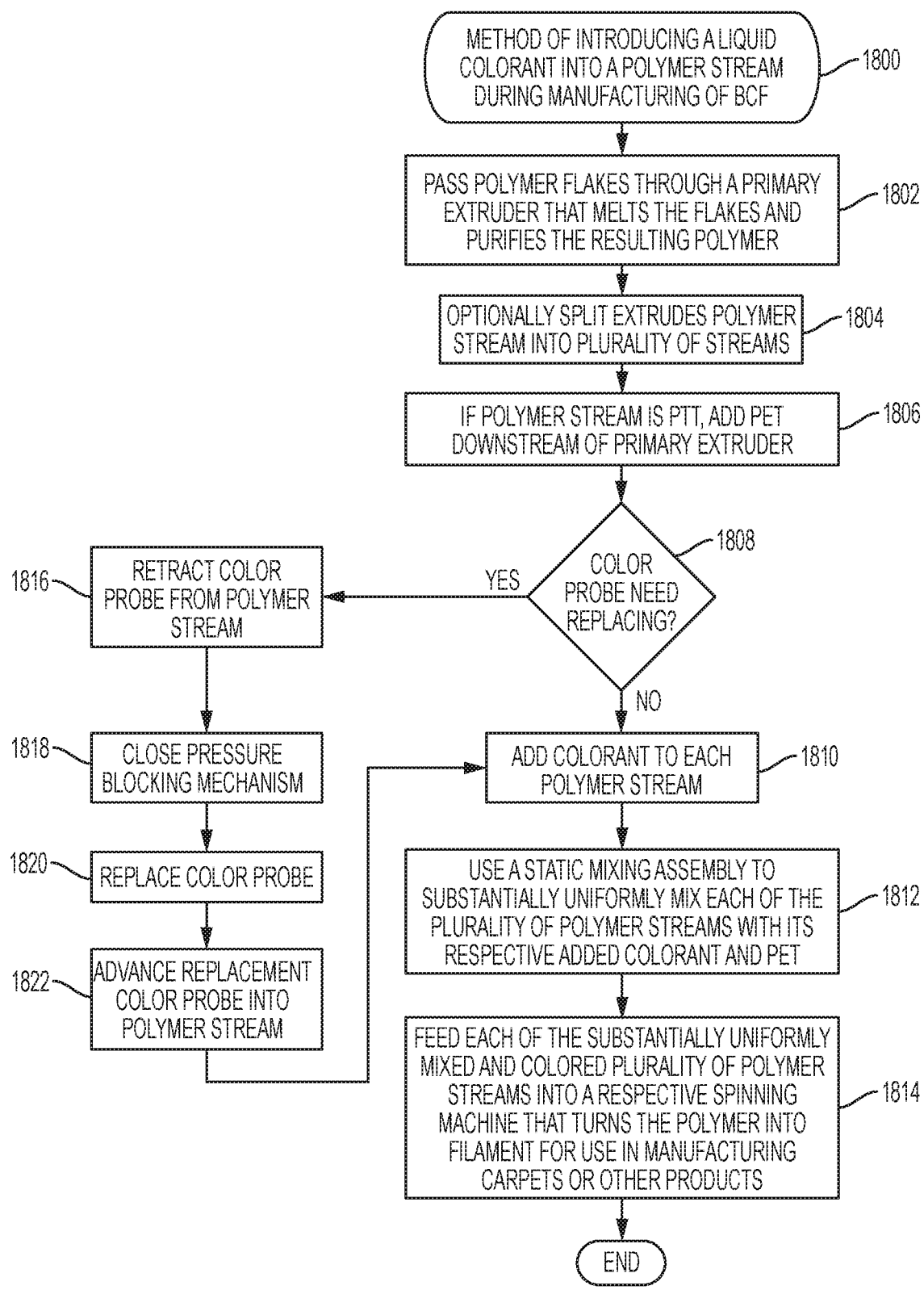
FIG. 18 depicts a high-level overview of a process for introducing a liquid colorant into a polymer stream during manufacturing of a bulked continuous filament, according to various embodiments described herein.

FIG. 18 depicts a high level overview of a process 1800 for introducing a liquid colorant into a polymer stream during manufacturing of a bulked continuous filament, according to various embodiments described herein. The process 1800 begins at operation 1802, where PTT 200 flakes, or other polymer flakes (e.g., PET 220), may be passed through an extruder that melts the flakes and purifies the resulting polymer. At operation 1804, the extruded polymer stream may then be optionally split into a plurality of polymer streams. If the polymer stream is a stream of PTT 200, then PET 220 may be added downstream of the primary extruder 208 at operation 1806. At operation 1808, a feedback loop may be used to determine whether the color injection probe 1304 needs replacing. If not, then liquid colorant may be added to each polymer stream at operation 1810. In particular embodiments, PET may be added to PTT without the addition of a colorant, while in other particular embodiments, colorant may be added to PTT or PET with the addition of another polymer. In still other particular embodiments, PET and colorant may be added to PTT. One or more static mixing assemblies 208 may be used to mix each of the polymer streams at operation 1812, mixing either or both the added colorant and/or PET 220 with molten PTT 200 according to the embodiment implemented. At operation 1814, each of the polymer streams may be fed into a respective spinning machine 212 to turn the polymer into a BCF for use in manufacturing carpets or other products.

If, at operation 1808, it is determined that the color injection probe 1304 needs to be replaced or removed, then the process 1800 may proceed to operation 1816 where the transition between open and closed configurations 1604 and 1602, respectively, begins. At operation 1816, the color injection assembly 1302 is configured in the open configuration 1602, as shown in FIGS. 15 and 16B. To begin the transition to the closed configuration 1604, the color probe 1304 is retracted from the stream engagement portion 1516 and back through the cylindrical pressure barrier 1612. After retracting the color probe 1304 through the cylindrical pressure barrier 1612, at operation 1818, the cylindrical pressure barrier 1612 is rotated as described above to close or block the color probe channel 1526 to prevent backflow of the polymer stream through the color injection assembly 1302.

At operation 1820, the color injection probe 1304 may be unscrewed or otherwise removed from the plunger 1520 and replaced with a replacement color injection probe. Alternatively, at operation 1820, the color injection probe 1304 may be unscrewed or otherwise removed from the plunger 1520 and replaced with a color probe channel plug. At operation 1822, the cylindrical pressure barrier 1612 is rotated to align the color probe passage 1606 with the color probe channel 1526 to open the color injection assembly 1302 and the replacement color probe is advanced into the polymer stream. The process 1800 may then proceed to operation 1810 and continues as described above.

Operation 5: Using a Spinning Machine to Turn the Colored Polymer into Filament

Referring back to FIG. 2, after the polymer stream (e.g., a substantially PET, substantially PTT, or a mixed polymer stream) and/or the added colorant have been sufficiently mixed using the one or more static mixing assemblies 208 (e.g., homogeneously mixed), the resultant colored and/or mixed polymer stream may be fed directly into the BCF (or "spinning") machine 212 that may be configured to turn the molten polymer into BCF (see, e.g., FIG. 2). In particular embodiments, the spinning machine 212 extrudes molten polymer through small holes in a spinneret in order to produce carpet yarn filament from the polymer. In particular embodiments, the molten recycled PET polymer cools after leaving the spinneret. The carpet yarn may then be taken up by rollers and ultimately turned into filaments that may be used to produce carpet. In various embodiments, the carpet yarn produced by the spinning machine 212 may have a tenacity between about 3 gram-force per unit denier (gf/den) and about 9 gf/den. In particular embodiments, the resulting carpet yarn has a tenacity of at least about 3 gf/den.

In particular embodiments, the spinning machine 212 used in the processes described herein may be a Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example provided above describes using the Sytec One spinning machine to produce carpet yarn filament from the polymer, it should be understood that any other suitable spinning machine may be used. Such spinning machines may include, for example, any suitable one-threadline or three-threadline spinning machine, including those made by Oerlika Neumag of Neumuenster, Germany, or such machines made by any other company.

In various embodiments, prior to using the spinning machine 212 to spin the colored melt into filament, the process may utilize one or more color sensors 210 to determine a color of the colored polymer stream. In various embodiments, the one or more color sensors 210 may include one or more spectrographs configured to separate light shone through the polymer stream into a frequency spectrum to determine the color of the polymer stream. In still other embodiments, the one or more color sensors 210 comprises one or more cameras or other suitable imaging devices configured to determine a color of the resultant polymer stream. In particular embodiments, in response to determining that the color of the polymer stream is a color other than a desired color (e.g., the polymer stream is lighter than desired, darker than desired, a color other than the desired color, etc.) the system may discard the portion of the stream with the incorrect color and/or adjust an amount of colorant 204 that is added to the flake and/or the polymer stream upstream in order to adjust a color of the resultant polymer stream. In particular embodiments, adjusting the amount of colorant 204 may be performed in a substantially automated manner (e.g., automatically) using the one or more color sensors 210 in a computer-controlled feedback control loop.

Figure 11:
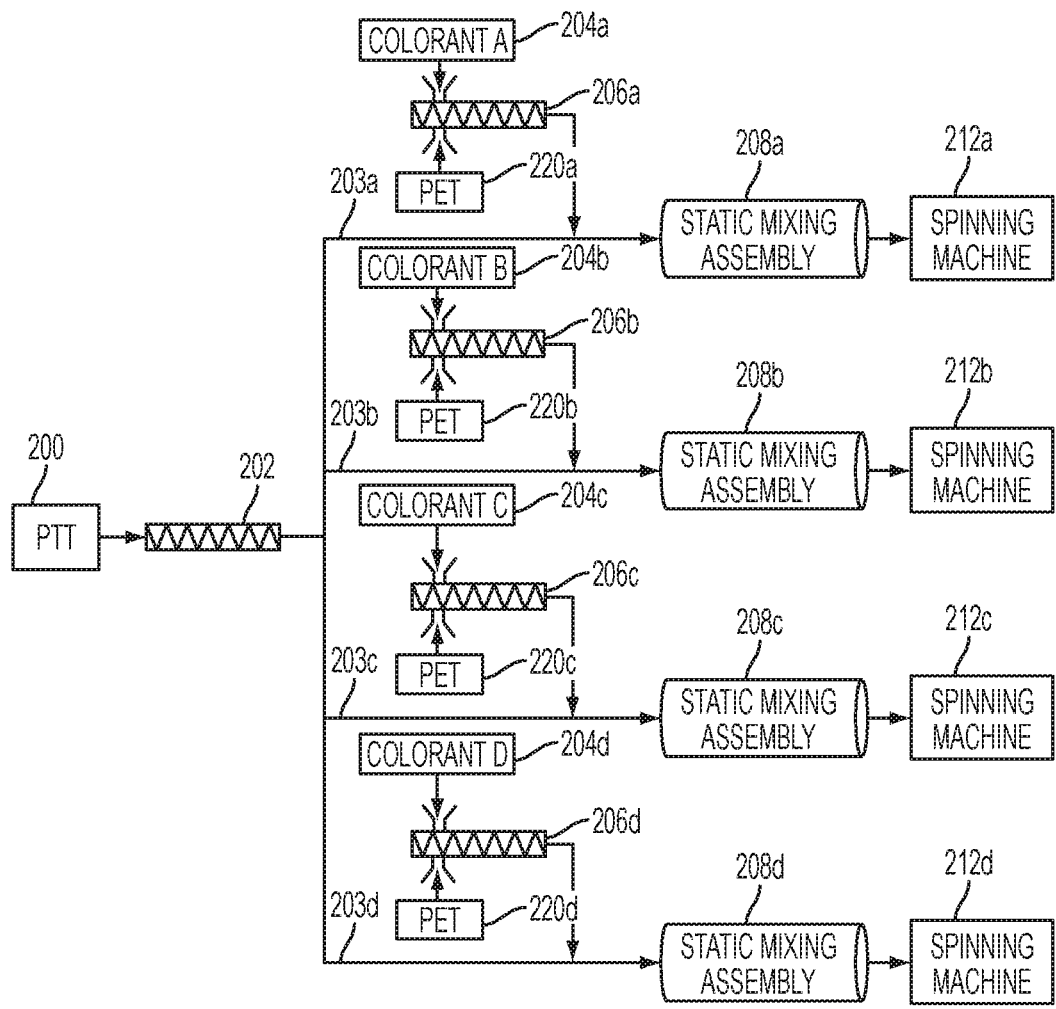
FIG. 11 depicts a process flow, according to a particular embodiment, for adding various colorants and PET to several streams of molten polymer downstream from a first extruder, according to various embodiments described herein.

Producing a Plurality of Different Colored Fibers Using a Single Primary Extruder In addition to the single colorant added to a single polymer stream from a primary extruder 202 described above with respect to FIG. 2, the process described herein may be utilized to produce a plurality of different colored filament from a single primary extruder. FIG. 11 depicts a process for producing a plurality of different colored filament from a single primary extruder (e.g., a single multiple screw extruder) according to a particular embodiment. As may be understood from FIG. 11, the process involves splitting the polymer stream of PTT 200 from the primary extruder 202 into a plurality of individual polymer streams 203a-d (e.g., four individual polymer streams) using any suitable technique. In other embodiments, the process may include splitting the polymer stream from the primary extruder 202 into any suitable number of individual polymer streams (e.g., two individual polymer streams, three individual polymer streams, four individual polymer streams, five individual polymer streams, six individual polymer streams, seven individual polymer streams, eight individual polymer streams, etc.)

As shown in FIG. 11, a colorant (e.g., Colorants A-D 204a-d) (e.g., liquid colorant, solid colorant, molten liquid polymeric masterbatch, liquid polymeric masterbatch, solid polymeric masterbatch, compounded coloring material, etc.) may be added to each individual polymer stream, for example, using a respective extruder 206a-d as described above. For example, Colorant C 204c may be added to individual polymer stream 203c using extruder 206c. In addition, or instead of adding colorant, PET 220 (e.g., PET 220a-d) may be added to each individual polymer stream at secondary extruders 206a-d, as described above.

Once the respective Colorants A-D 204a-d and/or PET 220a-d has been added to the respective individual polymer stream 203a-d, each individual polymer stream 203a-d with added Colorant A-D 204a-d and/or PET 220a-d is substantially uniformly mixed using respective one or more static mixing assemblies 208a-d. For example, once Colorant D 204d and/or PET 220d has been added to individual polymer stream 203d, the resultant colorant/PET/PTT mixture passes through the one or more static mixing assemblies 208d to mix the Colorant D 204d, the PET 220d, and/or the individual polymer stream 203d (e.g., to substantial homogeneity). Following mixture by the one or more static mixing assemblies 208a-d, the resultant respective colored polymer streams may be spun into filament using respective spinning machines 212a-d.

In various embodiments, it may be important to monitor the output of the extruder to determine a throughput of each individual polymer stream 203a-d. In such embodiments, monitoring throughput may ensure that each individual polymer stream 203a-d has the proper color letdown ratio in order to add a proper amount of Colorants A-D 204a-d to achieve a desired color of BCF.

As may be understood from FIG. 11, splitting extruded polymer from a primary extruder 202 into a plurality of polymer streams 203a-d prior to the addition of colorant may enable the production of a plurality of colored filament using a single primary extruder 202. Furthermore, by using a plurality of different colorants and extruders downstream of the primary extruder 202, the process may facilitate a reduction in waste when changing a colorant used. For example, when using a single extruder in which color is added upstream of the extruder, there is waste associated with changing over a color package in that the extruder must run for a sufficiently long amount of time between changes to ensure that all of the previous color has cleared the extruder (e.g., such that none of the previous color will remain and mix with the new color). In some cases, the wasted filament as a result of a switch in color may include up to several thousand pounds of filament (e.g., up to 4000 pounds). Using a (e.g., smaller) secondary extruder 206a-d to introduce colorant to the various individual polymer streams 203a-d downstream from the primary extruder 202 may reduce (e.g., substantially reduce) the amount of waste associated with a changeover of colorant (e.g., to below about 100 pounds per changeover). Moreover, adding PET 220 at the secondary extruders, at the static mixing assemblies, and/or within the static mixing assemblies significantly shortens the holdup time, which may improve the characteristics of the mixed polymer stream prior to spinning the polymer mixture into BCF.

ALTERNATIVE EMBODIMENTS

Various embodiments of a process for producing various colored bulked continuous filament may include features that vary from or are in addition to those described above. Exemplary alternative embodiments are described below.

Addition of Liquid Colorant to Polymer Stream Using Pump

Figure 12:
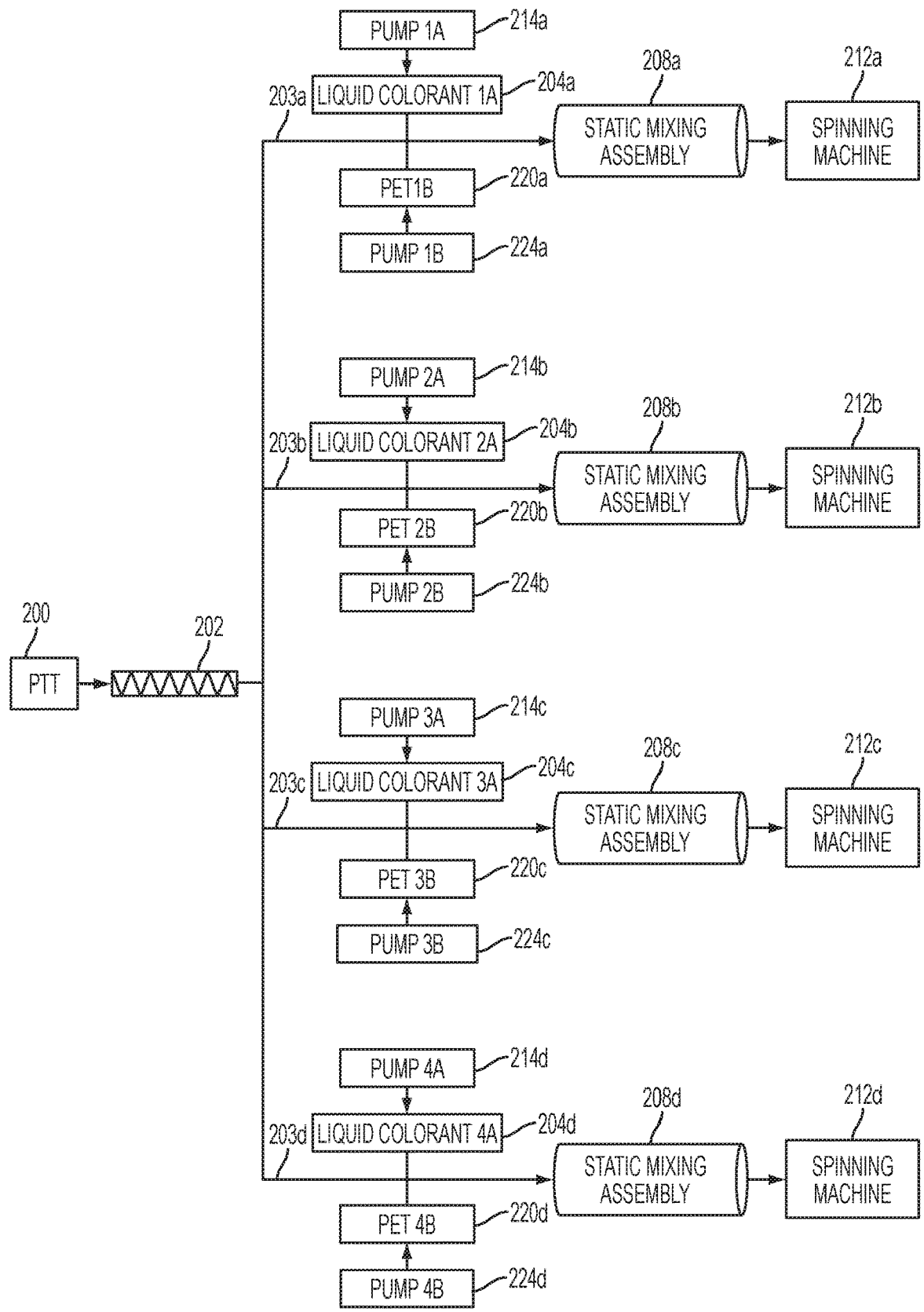
FIG. 12 depicts a process flow, according to another embodiment, for adding various colorants and PET to several streams of molten polymer downstream from a first extruder, according to various embodiments described herein.

FIG. 12 depicts an alternative process flow that in many respects may be similar to the process flow shown in FIG. 11. In the particular embodiments illustrated by FIG. 12, however, liquid colorant 204a-d is added to the individual polymer streams 203a-d using a pump 214a-d rather than an extruder. In such embodiments, using a liquid colorant may have the benefit of additional cost saving due to not having to use additional secondary extruders (e.g., which may have a greater initial cost outlay than a pump, greater running costs than a pump, etc.). In particular embodiments in which a pump 214a-d is used to inject the liquid colorant 214a-d into the individual polymer streams 203a-d, the process may further include exchanging a hose used to connect the pump 214a-d to the individual polymer streams 203a-d when exchanging a particular liquid colorant (e.g., liquid colorant 204a) for a different liquid colorant (e.g., a liquid colorant of a different color). By exchanging the hose when exchanging colorants, waste may further be reduced in that the replacement hose is pre-purged of any residual colorant of the previous color. The color injection assemblies or ports 1302 described above with respect to FIGS. 15 and 16A-16C may be utilized in the embodiments described in regard to FIG. 12 and in the embodiments associated with FIG. 11. Moreover, this example also shows the addition of PET 220a-d using pumps 224a-d. The polymer injection ports 1508 described above with respect to FIGS. 15 and 17A-17C may be utilized to inject PET 220a-d in this example. In various embodiments, any combination of pump and extruders may be used (e.g., pumps for colorant and extruder for PET, extruder for PET and pump colorant).

CONCLUSION

Many modifications and other embodiments of the disclosure will come to mind to one skilled in the art to which this disclosure pertains having the benefit of the teachings presented in the foregoing descriptions and the associated drawings. In addition, it should be understood that various embodiments may omit any of the steps described above or add additional steps. Furthermore, any numerical ranges described herein are intended to capture every integer and fractional value within the described range (e.g., every rational number value within the described range).

For example, it should be understood that a range describing a letdown ration of between about two percent and about eight percent is intended to capture and disclose every rational number value percentage between two percent and eight percent (e.g., 2%, 3%, 4%, 5%, 6%, 7%, 8%, 2.1%, 2.01%, 2.001% . . . 7.999% and so on). Additionally, terms such as "about," "substantially," etc., when used to modify structural descriptions or numerical values, are intended to capture the stated shape, value, etc. as well as account for slight variations as a result of, for example, manufacturing tolerances. For example, the term "substantially rectangular" is intended to describe shapes that are both exactly rectangular (e.g., have four sides that meet at ninety degree angles) as well as shapes that are not quite exactly rectangular (e.g., shapes having four sides that meet at an angle in an acceptable tolerance of ninety degrees, such as 90°+/−4°)

In light of the above, it is to be understood that the disclosure is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A method of manufacturing bulked continuous carpet filament from polytrimethylene terephthalate (PTT), the method comprising:

providing an extruder;

using the extruder to at least partially melt the PTT into a polymer stream and at least partially purify the polymer stream;

providing a static mixing assembly downstream of the extruder;

adding polyethylene terephthalate (PET) to the polymer stream downstream of the extruder and before the static mixing assembly or along a length of the static mixing assembly between an upstream end and a downstream end of the static mixing assembly;

using the static mixing assembly to mix the polymer stream with the PET to create a mixed polymer stream;

forming the mixed polymer stream into bulked continuous carpet filament;

splitting the polymer stream into a plurality of individual polymer streams downstream from the extruder; and providing, for each stream of the plurality of individual polymer streams, a respective secondary extruder and a respective static mixing assembly, wherein adding the PET, using the static mixing assembly, and forming the mixed polymer stream into bulked continuous carpet filament occurs with respect to each stream of the plurality of individual polymer streams.

2. The method of claim 1, further comprising adding a liquid colorant to the polymer stream before the static mixing assembly or along the length of the static mixing assembly between the upstream end and the downstream end of the static mixing assembly, wherein using the static mixing assembly to mix the polymer stream with the PET to create the mixed polymer stream comprises using the static mixing assembly to mix the polymer stream with the PET and the liquid colorant to create a colored mixed polymer stream, and wherein forming the mixed polymer stream into the bulked continuous carpet filament comprises forming the colored mixed polymer stream into the bulked continuous carpet filament.

3. The method of claim 1, further comprising adding a molten polymeric masterbatch to the polymer stream before the static mixing assembly or along the length of the static mixing assembly between the upstream end and the downstream end of the static mixing assembly, wherein using the static mixing assembly to mix the polymer stream with the PET to create the mixed polymer stream comprises using the static mixing assembly to mix the polymer stream with the PET and the molten polymeric masterbatch to create a colored mixed polymer stream, and wherein forming the mixed polymer stream into the bulked continuous carpet filament comprises forming the colored mixed polymer stream into the bulked continuous carpet filament.

4. The method of claim 1, further comprising adding a liquid colorant to each stream of the plurality of individual polymer streams before the respective static mixing assembly or along the length of the respective static mixing assembly between the upstream end and the downstream end of the static mixing assembly, wherein using the static mixing assembly to mix the polymer stream with the PET to create the mixed polymer stream comprises using the respective static mixing assembly to mix each stream of the plurality of individual polymer streams with the PET and the liquid colorant to create a respective colored mixed polymer stream, and wherein forming the mixed polymer stream into the bulked continuous carpet filament comprises forming the respective colored mixed polymer stream into the bulked continuous carpet filament.

5. The method of claim 1, further comprising adding a molten polymeric masterbatch to each stream of the plurality of individual polymer streams, wherein using the static mixing assembly to mix the polymer stream with the PET to create the mixed polymer stream comprises using the respective static mixing assembly to mix each stream of the plurality of individual polymer streams with the PET and the molten polymeric masterbatch to create a respective colored mixed polymer stream, and wherein forming the mixed polymer stream into the bulked continuous carpet filament comprises forming the respective colored mixed polymer stream into the bulked continuous carpet filament.

6. The method of claim 5, wherein adding the molten polymeric masterbatch to each stream of the plurality of individual polymer streams comprises adding the molten polymeric masterbatch to the respective secondary extruder.

7. The method of claim 5, wherein adding the molten polymeric masterbatch to each stream of the plurality of individual polymer streams comprises adding the molten polymeric masterbatch before the respective static mixing assembly or along the length of the respective static mixing assembly between the upstream end and the downstream end of the respective static mixing assembly.

8. A method of manufacturing bulked continuous carpet filament from polytrimethylene terephthalate (PTT), the method comprising:

providing an extruder;

using the extruder to at least partially melt the PTT into a polymer stream and at least partially purify the polymer stream;

providing a static mixing assembly downstream of the extruder;

adding a liquid colorant to the polymer stream before the static mixing assembly or along a length of the static mixing assembly between an upstream end and a downstream end of the static mixing assembly;

using the static mixing assembly to mix the polymer stream with the liquid colorant to create a colored polymer stream;

forming the colored polymer stream into bulked continuous carpet filament;

splitting the polymer stream into a plurality of individual polymer streams downstream from the extruder; and providing, for each stream of the plurality of individual polymer streams, a respective secondary extruder and a respective static mixing assembly, wherein adding the liquid colorant, using the static mixing assembly, and forming the colored polymer stream into the bulked continuous carpet filament occurs with respect to each stream of the plurality of individual polymer streams.

9. The method of claim 8, further comprising adding polyethylene terephthalate (PET) to the polymer stream;

wherein using the static mixing assembly to mix the polymer stream with the liquid colorant to create the colored polymer stream comprises using the static mixing assembly to mix the polymer stream with the liquid colorant and the PET to create a colored mixed polymer stream, and wherein forming the colored polymer stream into the bulked continuous carpet filament comprises forming the colored mixed polymer stream into the bulked continuous carpet filament.

10. The method of claim 9, wherein adding the PET to the polymer stream comprises adding the PET to the extruder.

11. The method of claim 9, wherein adding the PET to the polymer stream comprises adding the PET before the static mixing assembly or along the length of the static mixing assembly between the upstream end and the downstream end of the static mixing assembly.

12. The method of claim 8, further comprising adding polyethylene terephthalate (PET) to each stream of the plurality of individual polymer streams,
wherein using the static mixing assembly to mix the polymer stream with the liquid colorant to create the colored polymer stream comprises using the respective static mixing assembly to mix each stream of the plurality of individual polymer streams with the liquid colorant and the PET to create a respective colored mixed polymer stream, and
wherein forming the colored polymer stream into the bulked continuous carpet filament comprises forming the respective colored mixed polymer stream into the bulked continuous carpet filament.

13. The method of claim 12, wherein adding the PET to each stream of the plurality of individual polymer streams comprises adding the PET before the respective static mixing assembly or along the length of the respective static mixing assembly between the upstream end and the downstream end of the respective static mixing assembly.

14. A method of manufacturing bulked continuous carpet filament from polytrimethylene terephthalate (PTT), the method comprising:
providing an extruder;
using the extruder to at least partially melt the PTT into a polymer stream and at least partially purify the polymer stream;
providing a static mixing assembly downstream of the extruder;
adding a molten polymeric masterbatch to the polymer stream before the static mixing assembly or along a length of the static mixing assembly between an upstream end and a downstream end of the static mixing assembly;
using the static mixing assembly to mix the polymer stream with the molten polymeric masterbatch to create a colored polymer stream;
forming the colored polymer stream into bulked continuous carpet filament;
splitting the polymer stream into a plurality of individual polymer streams downstream from the extruder; and
providing, for each stream of the plurality of individual polymer streams, a respective secondary extruder and a respective static mixing assembly, wherein adding the molten polymeric masterbatch, using the static mixing assembly, and forming the colored polymer stream into the bulked continuous carpet filament occurs with respect to each stream of the plurality of individual polymer streams.

15. The method of claim 14, further comprising adding polyethylene terephthalate (PET) to the polymer stream,
wherein using the static mixing assembly to mix the polymer stream with the molten polymeric masterbatch to create the colored polymer stream comprises using the static mixing assembly to mix the polymer stream with the molten polymeric masterbatch and the PET to create a colored mixed polymer stream, and
wherein forming the colored polymer stream into the bulked continuous carpet filament comprises forming the colored mixed polymer stream into the bulked continuous carpet filament.

16. The method of claim 14, further comprising adding polyethylene terephthalate (PET) to each stream of the plurality of individual polymer streams,
wherein using the static mixing assembly to mix the polymer stream with the molten polymeric masterbatch to create the colored polymer stream comprises using the respective static mixing assembly to mix each stream of the plurality of individual polymer streams with the molten polymeric masterbatch and the PET to create a respective colored mixed polymer stream, and
wherein forming the colored polymer stream into the bulked continuous carpet filament comprises forming the respective colored mixed polymer stream into the bulked continuous carpet filament.

17. The method of claim 16, wherein adding the PET to each stream of the plurality of individual polymer streams comprises adding the PET to the respective secondary extruder.

* * * * *